(12) United States Patent
Liu et al.

(10) Patent No.: US 10,255,023 B2
(45) Date of Patent: Apr. 9, 2019

(54) COLLABORATIVE ELECTRONIC WHITEBOARD PUBLICATION PROCESS

(71) Applicant: Haworth, Inc., Holland, MI (US)

(72) Inventors: Diyu Liu, Fremont, CA (US); Keefe Roedersheimer, Belmont, CA (US); Satish Santhakumar, Fremont, CA (US); Demian Entrekin, Oakland, CA (US)

(73) Assignee: HAWORTH, INC., Holland, MI (US)

( * ) Notice: Subject to any disclaimer, the term of this patent is extended or adjusted under 35 U.S.C. 154(b) by 127 days.

(21) Appl. No.: 15/340,810

(22) Filed: Nov. 1, 2016

(65) Prior Publication Data

US 2017/0235537 A1 Aug. 17, 2017

Related U.S. Application Data

(60) Provisional application No. 62/294,746, filed on Feb. 12, 2016.

(51) Int. Cl.
*H04L 29/06* (2006.01)
*G06F 3/14* (2006.01)
(Continued)

(52) U.S. Cl.
CPC .......... *G06F 3/1454* (2013.01); *G06F 3/0484* (2013.01); *G09G 5/14* (2013.01); *H04L 65/403* (2013.01)

(58) Field of Classification Search
CPC .. G06F 3/0481; G06F 3/04842; G06F 3/0482; G06F 3/1454; G06F 3/0484; H04L 65/403; G09G 5/14
(Continued)

(56) References Cited

U.S. PATENT DOCUMENTS 4,686,332 A 8/1987 Greanias et al.
5,008,853 A 4/1991 Bly et al.
(Continued)

FOREIGN PATENT DOCUMENTS

JP 2002116996 A 4/2002
JP 2005258877 A 9/2005
(Continued)

OTHER PUBLICATIONS

Anacore, "Anacore Presents Synthesis", InfoComm 2012: Las Vegas, NV, USA, Jun. 9-15, 2012, 2 pages, screen shots taken from http://www.youtube.com/watch?v=FbQ9P1c5aNk (visited Nov. 1, 2013).

(Continued)

*Primary Examiner* — Kyle R Stork
*Assistant Examiner* — Hassan Mrabi
(74) *Attorney, Agent, or Firm* — Haynes Beffel & Wolfeld LLP

(57) ABSTRACT

A collaboration system including a spatial event map that can be published as an electronic document by a collaboration server and consumed by a consuming workstation. The electronic document is self-contained, and includes a viewer that has a module for rendering each of the graphical target types in the workspace onto a screen space. The system includes a server-side data processor that maintains the spatial event map which locates events in a workspace. The spatial event map includes a log of events, entries in the log having a location of a graphical target of the event in the workspace and a time.

37 Claims, 16 Drawing Sheets

(51) Int. Cl.
*G06F 3/0484* (2013.01)
*G09G 5/14* (2006.01)

(58) Field of Classification Search
USPC ........................................................ 715/759
See application file for complete search history.

(56) References Cited

U.S. PATENT DOCUMENTS

| | | | |
|---|---|---|---|
| 5,220,657 A | 6/1993 | Bly et al. | |
| 5,309,555 A | 5/1994 | Akins et al. | |
| 5,394,521 A | 2/1995 | Henderson, Jr. et al. | |
| 5,446,842 A | 8/1995 | Schaeffer et al. | |
| 5,537,526 A | 7/1996 | Anderson et al. | |
| 5,689,628 A * | 11/1997 | Robertson | G06F 3/04815 345/427 |
| 5,781,732 A | 7/1998 | Adams | |
| 5,818,425 A | 10/1998 | Want et al. | |
| 5,835,713 A | 11/1998 | FitzPatrick et al. | |
| 5,872,924 A | 2/1999 | Nakayama et al. | |
| 5,938,724 A | 8/1999 | Pommier et al. | |
| 6,078,921 A | 6/2000 | Kelley | |
| 6,084,584 A | 7/2000 | Nahi et al. | |
| 6,128,014 A | 10/2000 | Nakagawa et al. | |
| 6,167,433 A | 12/2000 | Maples et al. | |
| 6,320,597 B1 | 11/2001 | Leperen | |
| 6,342,906 B1 | 1/2002 | Kumar et al. | |
| 6,343,313 B1 | 1/2002 | Salesky et al. | |
| 6,564,246 B1 | 5/2003 | Varma et al. | |
| 6,710,790 B1 | 3/2004 | Fagioli | |
| 6,778,989 B2 | 8/2004 | Bates et al. | |
| 6,911,987 B1 | 6/2005 | Mairs et al. | |
| 6,930,673 B2 | 8/2005 | Kaye et al. | |
| 7,003,728 B2 | 2/2006 | Berque | |
| 7,043,529 B1 | 5/2006 | Simonoff | |
| 7,129,934 B2 | 10/2006 | Luman et al. | |
| 7,171,448 B1 | 1/2007 | Danielsen et al. | |
| 7,356,563 B1 | 4/2008 | Leichtling et al. | |
| 7,450,109 B2 | 11/2008 | Halcrow et al. | |
| D600,703 S | 9/2009 | LaManna et al. | |
| 7,908,325 B1 | 3/2011 | Pabla et al. | |
| 8,209,308 B2 | 6/2012 | Rueben et al. | |
| D664,562 S | 7/2012 | McCain et al. | |
| 8,402,391 B1 | 3/2013 | Doray et al. | |
| 8,407,290 B2 | 3/2013 | Abt, Jr. et al. | |
| 9,201,854 B1 | 12/2015 | Kloiber et al. | |
| 9,298,834 B2 | 3/2016 | Kleppner et al. | |
| 9,465,434 B2 | 10/2016 | Mason | |
| 9,471,192 B2 | 10/2016 | Mason | |
| 9,479,548 B2 | 10/2016 | Jensen et al. | |
| 9,479,549 B2 | 10/2016 | Pearson | |
| 2003/0020671 A1 | 1/2003 | Santoro et al. | |
| 2004/0060037 A1 | 3/2004 | Damm et al. | |
| 2004/0150627 A1 | 8/2004 | Luman et al. | |
| 2004/0155871 A1 | 8/2004 | Perski et al. | |
| 2005/0060656 A1 | 3/2005 | Martinez et al. | |
| 2005/0273700 A1 | 12/2005 | Champion et al. | |
| 2006/0012580 A1 | 1/2006 | Perski et al. | |
| 2006/0066588 A1 | 3/2006 | Lyon et al. | |
| 2006/0211404 A1 | 9/2006 | Cromp et al. | |
| 2006/0220982 A1 | 10/2006 | Ueda | |
| 2006/0224427 A1 | 10/2006 | Salmon | |
| 2006/0294473 A1 | 12/2006 | Keely et al. | |
| 2007/0262964 A1 | 11/2007 | Zotov et al. | |
| 2008/0143818 A1 | 6/2008 | Ferren et al. | |
| 2008/0163053 A1 | 7/2008 | Hwang et al. | |
| 2008/0177771 A1 | 7/2008 | Vaughn | |
| 2008/0201339 A1 | 8/2008 | McGrew et al. | |
| 2008/0207188 A1 | 8/2008 | Ahn et al. | |
| 2008/0301101 A1 | 12/2008 | Baratto et al. | |
| 2009/0089682 A1 | 4/2009 | Baier et al. | |
| 2009/0128516 A1 | 5/2009 | Rimon et al. | |
| 2009/0153519 A1 | 6/2009 | Suarez Rovere | |
| 2009/0160786 A1 | 6/2009 | Finnegan | |
| 2009/0174679 A1 | 7/2009 | Westerman | |
| 2009/0195518 A1 | 8/2009 | Malice et al. | |
| 2009/0207146 A1 | 8/2009 | Shimasaki et al. | |
| 2009/0217177 A1 | 8/2009 | DeGrazia | |
| 2009/0234721 A1 | 9/2009 | Bigelow et al. | |
| 2009/0251457 A1 | 10/2009 | Walker et al. | |
| 2009/0278806 A1 | 11/2009 | Duarte et al. | |
| 2010/0011316 A1 | 1/2010 | Sar et al. | |
| 2010/0017727 A1 | 1/2010 | Offer et al. | |
| 2010/0073454 A1 | 3/2010 | Lovhaugen et al. | |
| 2010/0132034 A1 | 5/2010 | Pearce et al. | |
| 2010/0205190 A1 | 8/2010 | Morris et al. | |
| 2010/0211920 A1 | 8/2010 | Westerman et al. | |
| 2010/0306650 A1 | 12/2010 | Oh et al. | |
| 2010/0306696 A1 | 12/2010 | Groth et al. | |
| 2010/0309148 A1 | 12/2010 | Fleizach et al. | |
| 2010/0318921 A1 | 12/2010 | Trachtenberg et al. | |
| 2010/0328306 A1 | 12/2010 | Chau et al. | |
| 2011/0047505 A1 | 2/2011 | Fillion et al. | |
| 2011/0050640 A1 | 3/2011 | Lundback et al. | |
| 2011/0063191 A1 | 3/2011 | Leung et al. | |
| 2011/0069184 A1 | 3/2011 | Go | |
| 2011/0154192 A1 | 6/2011 | Yang et al. | |
| 2011/0183654 A1 | 7/2011 | Lanier et al. | |
| 2011/0197147 A1 | 8/2011 | Fai | |
| 2011/0208807 A1 | 8/2011 | Shaffer | |
| 2011/0225494 A1 | 9/2011 | Shmuylovich et al. | |
| 2011/0243380 A1 | 10/2011 | Forutanpour et al. | |
| 2011/0246875 A1 | 10/2011 | Parker et al. | |
| 2011/0264785 A1 | 10/2011 | Newman et al. | |
| 2011/0271229 A1 | 11/2011 | Yu | |
| 2012/0019452 A1 | 1/2012 | Westerman | |
| 2012/0030193 A1 | 2/2012 | Richberg et al. | |
| 2012/0050197 A1 | 3/2012 | Kemmochi | |
| 2012/0075212 A1 | 3/2012 | Park et al. | |
| 2012/0124124 A1 | 5/2012 | Beaty et al. | |
| 2012/0127126 A1 | 5/2012 | Mattice et al. | |
| 2012/0169772 A1 | 7/2012 | Werner et al. | |
| 2012/0176328 A1 | 7/2012 | Brown et al. | |
| 2012/0179994 A1 | 7/2012 | Knowlton et al. | |
| 2012/0229425 A1 | 9/2012 | Barrus et al. | |
| 2012/0254858 A1 | 10/2012 | Moyers et al. | |
| 2012/0260176 A1 | 10/2012 | Sehrer | |
| 2012/0274583 A1 | 11/2012 | Haggerty | |
| 2012/0278738 A1 | 11/2012 | Kruse et al. | |
| 2012/0320073 A1 | 12/2012 | Mason | |
| 2013/0004069 A1 | 1/2013 | Hawkins et al. | |
| 2013/0027404 A1 | 1/2013 | Sarnoff | |
| 2013/0047093 A1 | 2/2013 | Reuschel et al. | |
| 2013/0198653 A1 | 8/2013 | Tse et al. | |
| 2013/0218998 A1 | 8/2013 | Fischer et al. | |
| 2013/0222371 A1 | 8/2013 | Reitan | |
| 2013/0346878 A1 | 12/2013 | Mason | |
| 2013/0346910 A1 | 12/2013 | Mason | |
| 2014/0033067 A1 | 1/2014 | Pittenger et al. | |
| 2014/0040767 A1 | 2/2014 | Bolia | |
| 2014/0055400 A1 | 2/2014 | Reuschel | |
| 2014/0062957 A1 | 3/2014 | Perski et al. | |
| 2014/0063174 A1 | 3/2014 | Junuzovic et al. | |
| 2014/0222916 A1 * | 8/2014 | Foley | G06Q 10/101 709/204 |
| 2014/0223334 A1 | 8/2014 | Jensen et al. | |
| 2014/0223335 A1 | 8/2014 | Pearson | |
| 2014/0282229 A1 | 9/2014 | Laukkanen et al. | |
| 2014/0380193 A1 | 12/2014 | Coplen et al. | |
| 2015/0007055 A1 | 1/2015 | Lemus et al. | |
| 2015/0089452 A1 | 3/2015 | Dorninger | |
| 2015/0185990 A1 | 7/2015 | Thompson | |
| 2015/0248384 A1 | 9/2015 | Luo et al. | |
| 2015/0279071 A1 | 10/2015 | Xin | |
| 2015/0331489 A1 | 11/2015 | Edwardson | |
| 2016/0085381 A1 | 3/2016 | Parker et al. | |
| 2016/0142471 A1 | 5/2016 | Tse et al. | |
| 2016/0328098 A1 | 11/2016 | Santhakumar et al. | |
| 2016/0328114 A1 | 11/2016 | Santhakumar et al. | |
| 2017/0090852 A1 * | 3/2017 | Harada | G06F 3/0482 |

(56) References Cited

U.S. PATENT DOCUMENTS

2017/0315767 A1    11/2017  Rao
2017/0330150 A1*   11/2017  Foley ............... G06Q 10/101

FOREIGN PATENT DOCUMENTS

| JP | 2010129093 A  | 6/2010  |
|----|---------------|---------|
| JP | 2010134897 A  | 6/2010  |
| JP | 2010165178 A  | 7/2010  |
| JP | 2010218313 A  | 9/2010  |
| WO | 2011029067 A2 | 3/2011  |
| WO | 2011048901 A1 | 4/2011  |
| WO | 2012162411 A1 | 11/2012 |
| WO | 2014023432 A1 | 2/2014  |

OTHER PUBLICATIONS

Ionescu, Ama, et al., "WorkspaceNavigator: Tools for Capture, Recall and Reuse using Spatial Cues in an Interactive Workspace," 2002, <URL=https://hci.stanford.edu/research/wkspcNavTR.pdf>, 16 p.

Johanson, Brad et al., "The Event Heap: an Enabling Infrastructure for Interactive Workspaces." 2000 <Url=https:// jraphics.stanford.edu/papers/eheap/>, 11 pages.

Masters Thesis: "The ANA Project, Development of the ANA-Core Software" Ariane Keller, Sep. 21, 2007, ETH Zurich, 92 pages.

Office Action in related U.S. Appl. No. 14/090,830, dated Dec. 3, 2015, 27 pages.

Office Action in related U.S. Appl. No. 14/090,830, dated May 5, 2016, 39 pages.

Taylor, Allen G., "SQL for Dummies," 7th Ed., published Jul. 5, 2012, 11 pages.

U.S. Appl. No. 13/758,993 entitled Line Drawing Behavior for Digital Whiteboard filed on Feb. 4, 2013, 46 pages.

U.S. Appl. No. 15/147,224, filed May 5, 2016 entitled "Virtual Workspace Viewport Location Markers in Collaboration Systems," 102 pages.

U.S. Appl. No. 15/147,576, filed May 5, 2016 entitled "Virtual Workspace Viewport Following in Collaboration Systems," 104 pages.

W3C Working Group Note, HTML: The Markup Language (an HTML language reference), http://www.w3.org/TR/html-rnarkup/iframe.html[Aug. 4, 2016 2:01:59 PM], 3 pages.

PCT Search Report and Written Opinion in PCT/US2017/017432 dated May 31, 2017, 14 pages.

"Ergonomics Data and Mounting Heights," Ergonomic Ground Rules, last revised Sep. 22, 2010, 2 pgs.

Albin, T., "Comfortable Portable Computing: The Ergonomic Equation," Copyright 2008 Ergotron, Inc., 19 pgs.

Office Action in related U.S. Appl. No. 15/147,224, dated Feb. 7, 2018, 16 pages.

PCT/US2016/031000—International Search Report and Written Opinion dated Aug. 16, 2016, 14 pages.

Villamor, C., et al., "Touch Gesture Reference Guide", Apr. 15, 2010, retrieved from the internet: http://web.archive.org/web/20100601214053; http://www.lukew.com/touch/TouchGestureGuide.pdf, 7 pages, retrieved on Apr. 10, 2014.

U.S. Office Action in U.S. Appl. No. 15/147,576 dated Oct. 5, 2018, 21 pages.

* cited by examiner

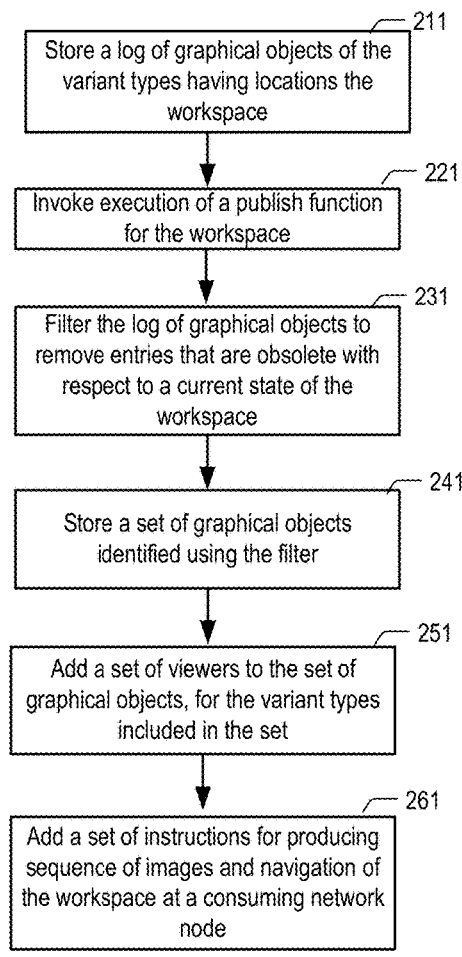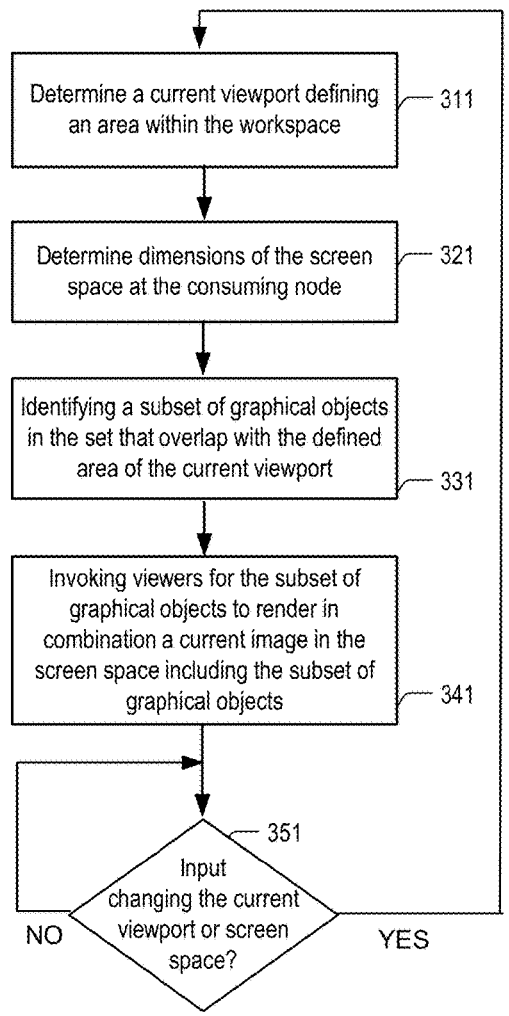
FIG. 3A
FIG. 3B

```
\---PortableElectronicDocument
    \---4jtBYJ9DTo21imQY9t2R ──────────────────────────── 603
        |   application-8d9c1c76318f0dac61b4b640ef690648.css ── 605
        |   assets.json ──────────────────────────────── 607
        |   history.json ─────────────────────────────── 609
        |   local.json ───────────────────────────────── 611
        |   urlMetadata.json ─────────────────────────── 613
        |   index.html ───────────────────────────────── 615
        +---scripts
        |       configuration-2641ce895f3b6b9edd99ff86feb037ef.js ⎤
        |       externals-fe7f3c5a6add2f694512b244514d9977.js     ⎥──619
        |       templates-3feff1f707d3ae83cac53c43132a2f0c.js     ⎥
        |       application-bf2c0ecbbb3df546359dde701a19c384.js   ⎦
        +---toolbar ─────────────────────────────────── 623
        +---screenshots ─────────────────────────────── 627
        |   |   googledocswidget_forms.png              ⎤
        |   |   YouTube.png                             ⎥
        |   |   google-map.png                          ⎥
        |   |   google-docs.png                         ⎥
        |   |   googledocswidget_signin.png             ⎥
        |   |   googledocswidget_presentation.png       ⎥
        |   |   googledocswidget_forms_published.png    ⎥
636 ────┼──┼── googledocswidget_presentation_published.png ⎥──635
        |   |   googledocswidget_spreadsheets.png       ⎥
        |   |   googledocswidget_document_published.png ⎥
        |   |   googledocswidget_document.png           ⎥
        |   |   googledocswidget_drawings.png           ⎥
        |   |   googledocswidget_drawings_published.png ⎥
        |   |   googledocswidget_spreadsheets_published.png ⎦
        +---sessions
        |   \---objects ─────────────────────────────── 645
        |       \---4jtBYJ9DTo21imQY9t2R
        |           56e84eccbe73b522ed000004.PNG
        |                     .
        |                     .
        |                     .
        |           572293ebbe73b57d5400001f.pdf
```

FIG. 6

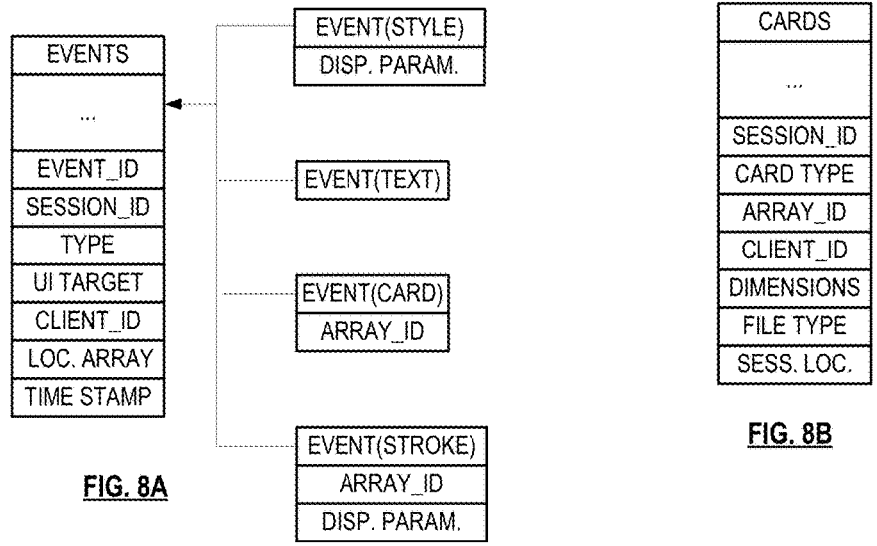
FIG. 8A
FIG. 8B
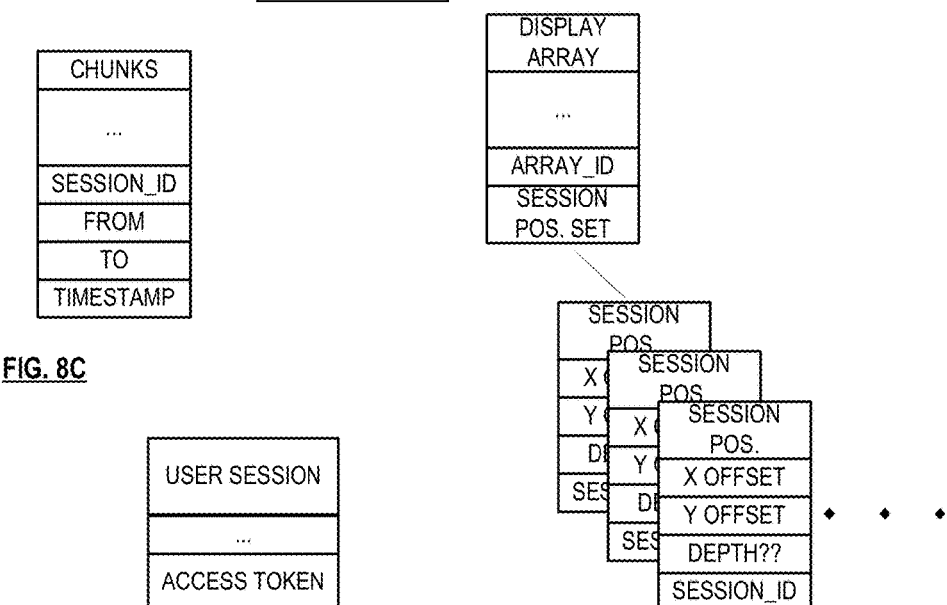
FIG. 8C
FIG. 8D
FIG. 8E

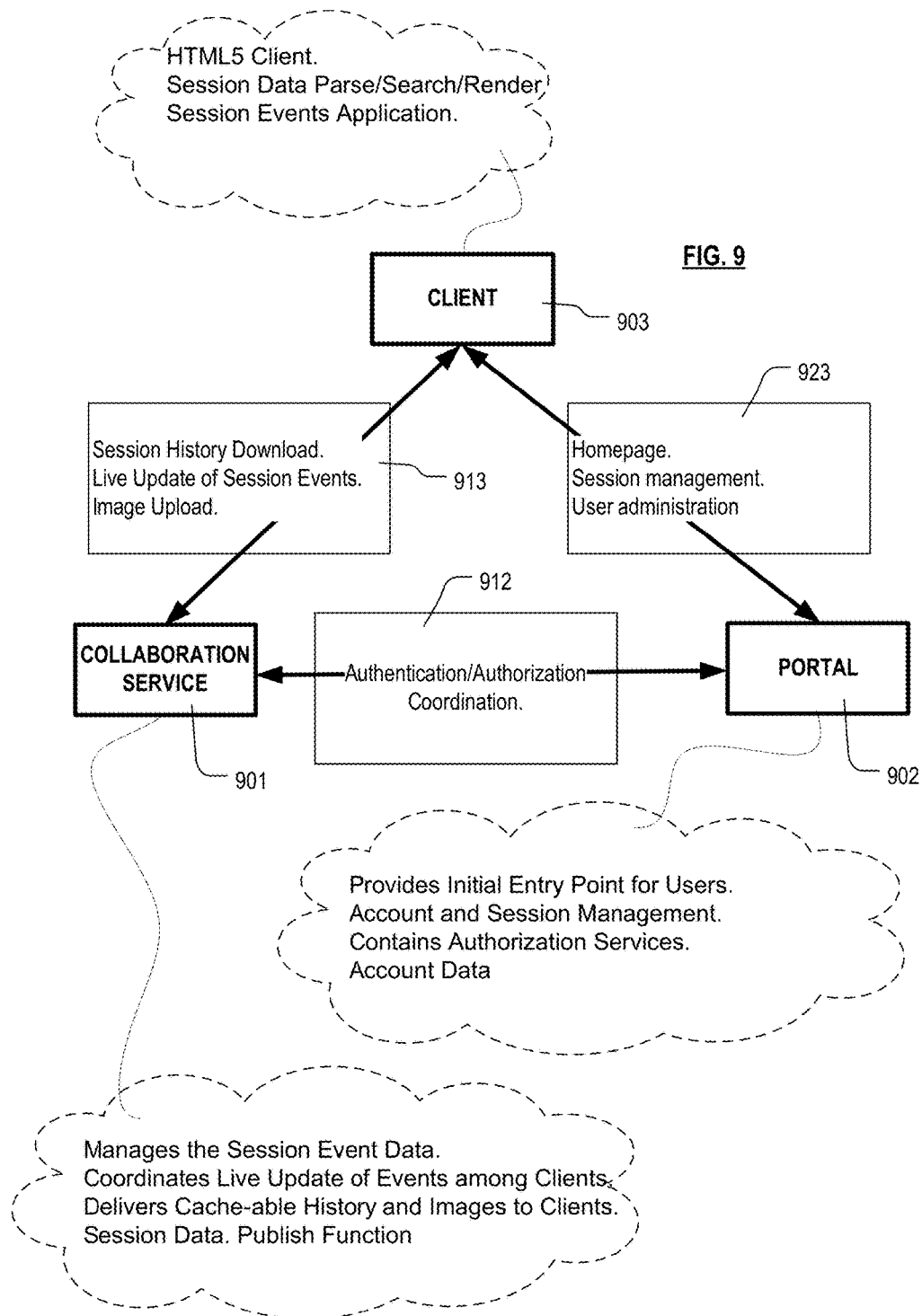

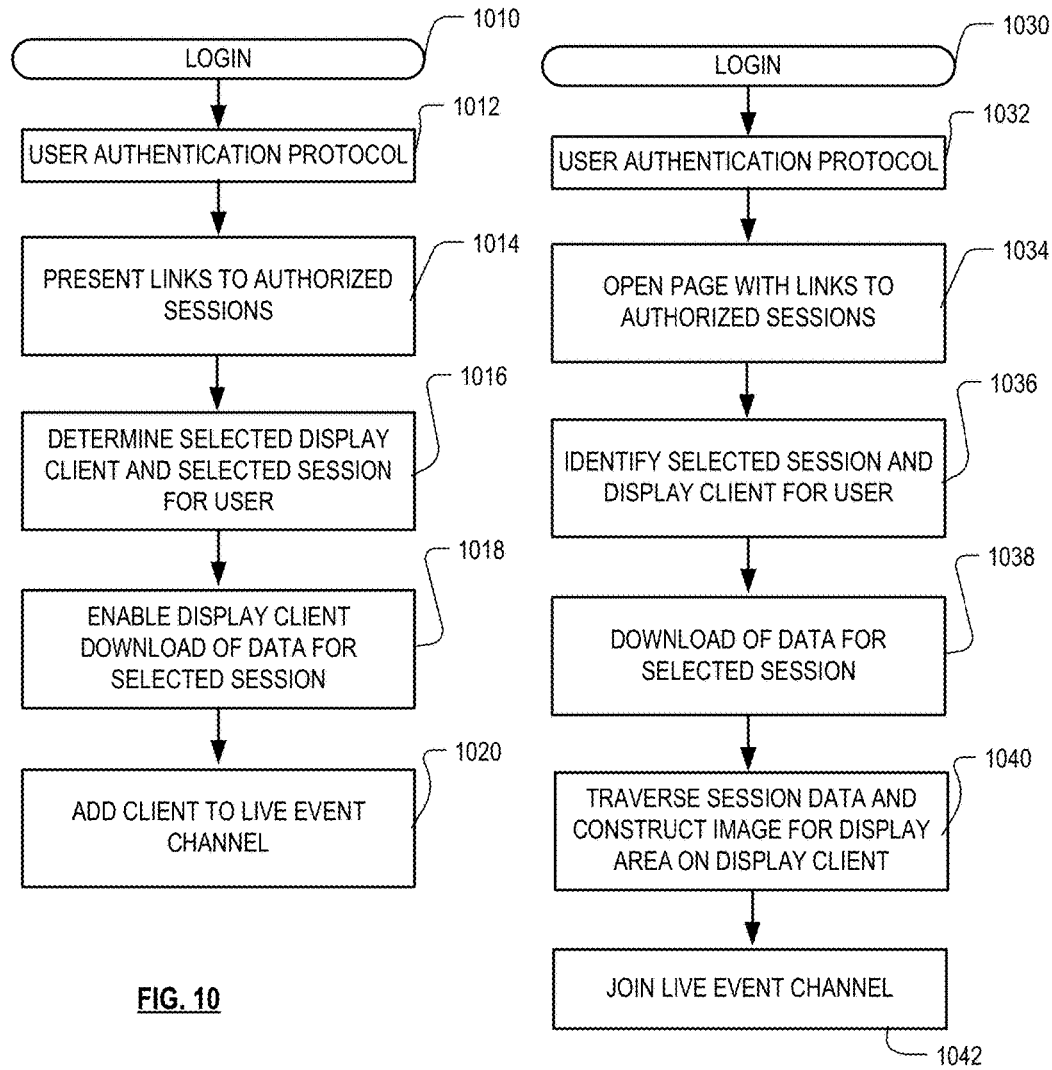

COLLABORATIVE ELECTRONIC WHITEBOARD PUBLICATION PROCESS

RELATED APPLICATION(S)

The application claims the benefit of U.S. provisional Patent Application No. 62/294,746, entitled, Collaborative Electronic Whiteboard Publication Process filed on 12 Feb. 2016. The provisional application is hereby incorporated by reference for all purposes.

The following co-pending, commonly owned, U.S. patent applications are incorporated by reference as if fully set forth herein; U.S. application Ser. No. 14/090,830, entitled Collaboration System Including a Spatial Event Map, filed 26 Nov. 2013, U.S. application Ser. No. 15/147,576, entitled Virtual Workspace Viewport Following In Collaboration Systems filed 5 May 2016, and U.S. application Ser. No. 15/147,224, entitled Virtual Workspace Viewport Location Markers In Collaboration Systems, filed 5 May 2016.

BACKGROUND

The invention relates to digital collaboration, and more particularly to digital display systems which facilitate multiple simultaneous users having access to global workspace data, and to publication of rich content electronic documents composed using such systems.

Digital displays can be used for interactive presentations and other purposes in a manner analogous to whiteboards. Some displays can be networked and used for collaboration, so that modifications made to the display image on one display are replicated on another display. Large scale displays offer the opportunity for more than one user to present or annotate simultaneously on the same surface.

Also, digital displays can comprise large display screens or arrays of screens in a single room, which are configured to provide a large interaction surface. Thus, it is anticipated that the large digital displays may be shared by many users at different times for different collaborations.

In addition, the distributed nature of the system leads to the possibility of multiple users in different places who interact with, and can change, the same workspace data at the same time, and at times when no other user is observing the workspace data.

Such collaboration systems enable creation of rich content workspaces, sometimes referred to as digital whiteboards, with content added to the workspace of a variety of types and from a variety of sources. The rich content is organized spatially rather than by the hierarchical file and page forms typical of prior art systems for storing and creating electronic documents.

The size of the workspace can be virtually unlimited, which can present a problem when one is trying to navigate the shared workspace. Co-pending U.S. application Ser. No. 15/147,576 and U.S. application Ser. No. 15/147,224, incorporated by reference above describe tools to address problems with navigation of unlimited space, including the creation and use of location markers and a "follow" mode for real time tracking of collaborators.

A workspace not only may have a very large size, but may include graphical objects of variant types located in the workspace, where the variant types of objects are rendered using different processes and sometimes proprietary processes. The large size and variant content make it impractical in prior art workspace technologies to share the workspace outside of the collaboration system.

It is desirable to share the rich content in ways that are portable, enabling the viewing of the content on external platforms not connected with the collaboration system.

SUMMARY

A technology is described for publication of a workspace, such as a digital whiteboard, which can have virtually unlimited size, and include variant types of graphical objects, in a manner that can be consumed by a computer outside of the collaboration system in which the workspace is created and modified.

A publication process described herein results in creation of an electronic document stored in a tangible, non-transitory computer readable memory. An electronic document as described herein comprises a set of graphical objects which can be provided in a read-only format. Graphical objects in the set have locations and dimensions that can be identified by coordinates in a virtual workspace. Also, the members of the set of graphical objects have variant types, where the variant types of graphical objects have variant data structures rendered by respective rendering procedures. The electronic document also includes a set of viewers, which include parameters and procedures for rendering the graphical objects in the set of graphical objects of variant types using the respective rendering procedures. The viewers can include procedures for reading the graphical objects, and rendering images within a browser window on a consuming computer device for example. The electronic document also includes instructions that, when executed on a consuming computer device, produce a sequence of images to be rendered within a screen space having dimensions on a display in communication with the computer device. The instructions to produce a sequence of images include (a) determining a current viewport defining an area within a workspace, (b) determining dimensions of the screen space, (c) identifying a subset of graphical objects in workspace that overlap with the defined area of the current viewport, and (d) invoking viewers for the subset of graphical objects to produce in combination a current image including the subset of graphical objects on the screen space, and (e) changing the current viewport in response to user input and repeating steps (a) to (d) to produce a next image in the sequence.

Also, an electronic document can include instructions that when executed apply a scale factor in the rendering of the graphical objects in the identified subset for the current viewport, which is a function of the dimensions of the viewport in the workspace and the dimensions of the screen space on the display.

In some examples, the screen space is a browser window on a display of a consuming computer device. The instructions in the electronic document can include logic to determine current dimensions of the browser window on the display to determine the dimensions of the screen space.

The electronic document can include initial viewport specifications, and instructions to use the initial viewport specifications as the current viewport when opening the electronic document. For example, the electronic document can have a URL, and the initial viewport specification can be included in the URL.

In an electronic document described herein, the variant types of graphical objects include a paged image, having a graphical frame and the plurality of page images of pages in the paged image. A graphical prompt is associated with the graphical frame which invokes instructions to change the page image shown within the graphical frame. The paged image can be produced by a publish function as described below from files having a page format for which native viewers are not provided in the electronic document.

In an electronic document described herein, the variant types of graphical objects can include a website image having a graphical frame, which when rendered by the corresponding viewer retrieves a page from the website identified by the graphical object, and renders the retrieved page within the graphical frame. In other examples, the graphical objects can include a website image which is static, and can be produced by a publish function by converting an instance of the website into an image which can be rendered by a viewer in the electronic document.

In an electronic document described herein, the variant types of graphical objects can include an image file, and the electronic document can include a set of versions of the image file. Each member of the set of versions can have a different screen space resolution, and the viewer in the electronic document for the image file includes logic to select a member of the set of versions as a function of the dimensions of the current viewport in the workspace and the dimensions of the screen space.

In an electronic document described herein, in which the workspace includes a location marker data structure identifying a location in the workspace, instructions are included to present a graphical user interface enabling user input to select a location marker, and in response to selection of a location marker to change the current viewport in the workspace including the identified location.

Also described herein is a computer system comprising a network node configured for executing a publish function, the system having memory, a processor and a communication port. The network node is configured to store in memory, accessible by the processor, the log of graphical objects in the workspace. Graphical objects have locations and dimensions in the workspace and have variant types as discussed above. The network node includes logic to invoke execution of the publish function. The publish function includes composing and storing electronic documents as described above.

The publish function can include logic to produce a URL for the electronic document, and logic to send the URL to a consumer network node, where the consumer network node comprises a platform that uses the electronic document to render images on a display.

The network node that executes the publish function can include a log of graphical objects that comprises a log of events, where the events create, modify or move graphical targets in a workspace, and where the graphical targets of the events include the graphical objects in the log. The publish function can include logic to filter the log of events to remove events that are obsolete with respect to the status or content of the workspace when the publish function is executed. The publish function can include logic to produce paged images as discussed above, and graphical frames for dynamic and static websites as discussed above. Also the publish function can include logic to produce multiple versions of an image file for the scaling process discussed above.

In some embodiments, the publish function is executed by a network node which also participates in the collaboration session that generates the contents of the workspace, such as a collaboration session based on a special event map.

Also described herein is a computer system which comprises a network node configured as a publication server for electronic documents as described herein. The publication server can be part of the same network node which executes the publish function, or part of a different network node.

The above summary is provided in order to provide a basic understanding of some aspects of the collaboration system and electronic document described herein. Other aspects of the technology are described below.

BRIEF DESCRIPTION OF THE DRAWINGS

The invention will be described with respect to specific embodiments thereof, and reference will be made to the drawings, which are not drawn to scale, and in which:

FIG. 3A is a flowchart illustrating a process for a publish function for the creation of an electronic document.

FIG. 3B is a flowchart illustrating a process for producing a sequence of images implemented by instructions in an electronic document.

FIG. 6 illustrates an excerpt of a file structure for an electronic document.

FIGS. 8A-8E illustrate example implementations of data structures used to store and communicate events for a collaboration system including a virtual workspace.

FIG. 9 illustrates functional features of actors in a collaboration system in one example of a system as described herein.

FIG. 10 is a flowchart illustrating aspects of server-side logic of a user login sequence that can be used for a collaboration system.

FIG. 11 is a flowchart illustrating aspects of client-side logic of a user login sequence that can be used for a collaboration system.

DETAILED DESCRIPTION

Figure 1:
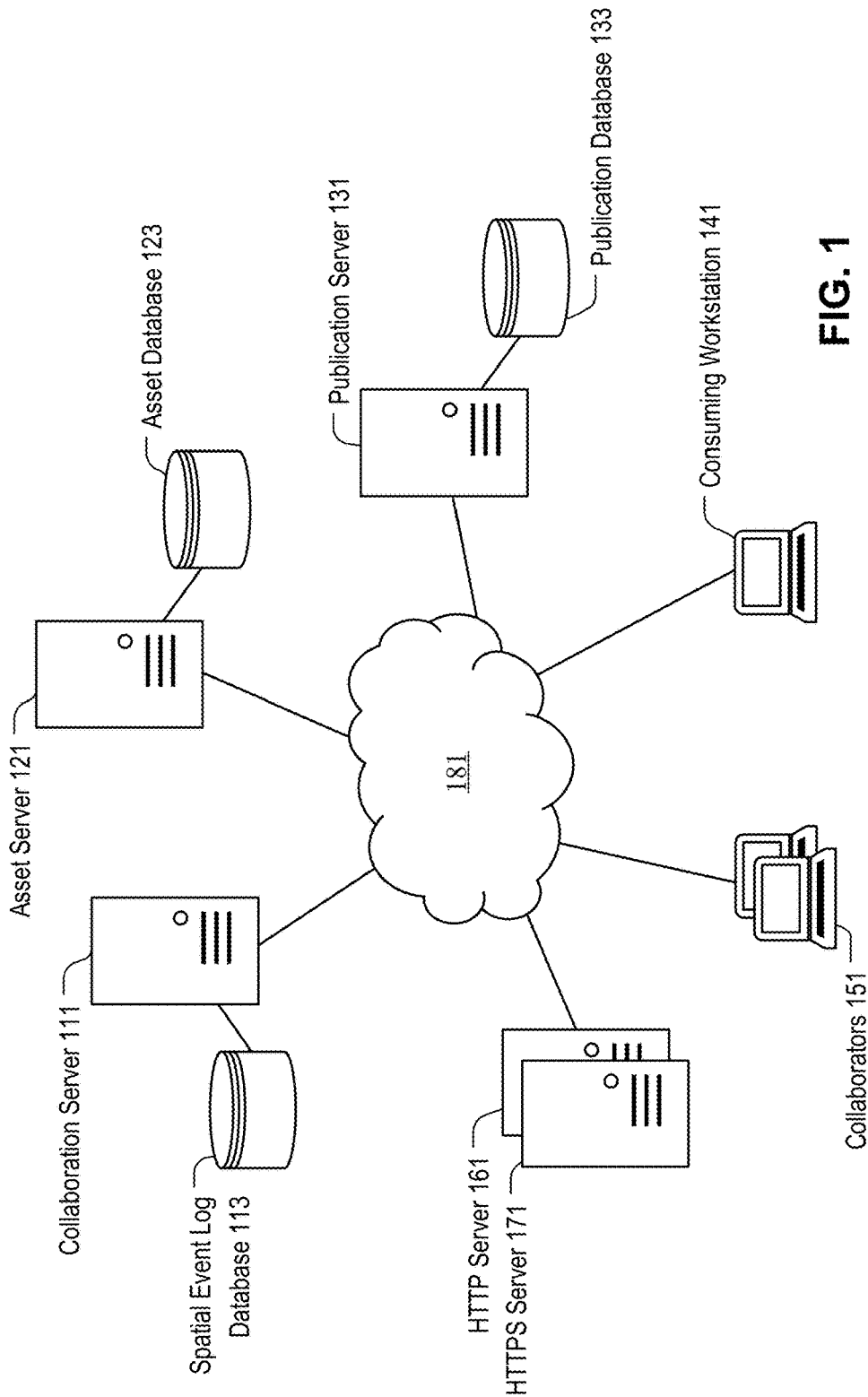
FIG. 1 illustrates one implementation of an environment where an electronic document can be created and consumed.

The following detailed description is made with reference to the figures. Sample implementations are described to illustrate the technology disclosed, not to limit its scope, which is defined by the claims.

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

A system is disclosed that supports the storing and tracking of a plurality of collaboration sessions, each of which is accessible across multiple devices and locations. The technology disclosed includes a method for creating an electronic document using the contents of a selected workspace produced in a collaboration session, such as a spatial event map collaboration system.

One system described herein comprises one or more data processors including memory storing computer programs for a database including one or more workspace data structures for corresponding workspaces. A workspace data structure can include a spatial event map for a specific workspace, or other data structure including graphical objects having locations in the workspace.

The system described includes a first network node including a display having a physical display space, a user input device, a processor and a communication port. The first network node can be configured with logic to establish communication with one or more other network nodes, which can include for example server-side network nodes and peer client-side network nodes, as a participant client in a workspace session. The first network node can have memory, or have access to memory, to store collaboration data identifying graphical objects having locations in a virtual workspace used in the workspace session. A collaboration system that supports an essentially unlimited amount of 2D and 3D working space for each session is described that can have many distributed digital displays which are used to display images based on the collaboration data. A collaboration data structure can include a log of events and graphical objects that are targets of the events, where entries in the log have location of the graphical target of the event in the workspace and a time. Also, entries in the log can include a parameter (e.g. url or actual file) identifying assets of the workspace with graphical constructs used to render the graphical target on a display. Server-side network nodes and client-side network nodes are described which interact to form a collaboration system by which the collaboration data structure can be made accessible to authorized clients, and clients can utilize the collaboration data structure to render local display areas, and create events that can be added to the collaboration data structure and shared with other clients.

The workspace associated with a specific collaboration session can be represented as an unbounded virtual area providing a frame of reference without a specified boundary, within which to locate events in time and in virtual collaboration space. The workspace can encompass a virtual area that is practically unlimited in that it has a size large enough that the likelihood of a client-side network node navigating beyond its boundaries is negligible. For example, a size encompassing a virtual area that maps to a physical display space including 1,000,000 pixels by 1,000,000 pixels can be considered practically unlimited in some settings. In some examples, the workspace is essentially "infinite" in that its size is only limited by the extent of the addressing scheme used to identify locations within the virtual space. Also, the system can include a number of workspaces, where each workspace can be configured individually for access by a single user or by a user group.

The collaboration system can be configured according to an application program interface API so that the server-side network nodes and the client-side network nodes can communicate about collaboration events. Messages can be defined that identify events that create or modify a graphical target having a location in the workspace and the time. The events can be classified as history events and as ephemeral events, where history events are stored in the spatial event map, and ephemeral events are not permanently stored with the spatial event map but distributed among other clients of the collaboration session.

An application program interface (API), including a set of operations and parameters for the operations, is provided which provides for participation in a workspace utilizing a spatial event map. The set of operations can be implemented in data processors using software-implemented functions, which can be hardware-assisted, configured to use the parameters and perform the operations of the API.

The Spatial Event Map contains information needed to define objects and events in a workspace. It is useful to consider the technology from the point of view of space, events, maps of events in the space, and access to the space by multiple users, including multiple simultaneous users.

Space: In order to support an unlimited amount of spatial information for a given collaboration session, we provide a way to organize a virtual space termed the workspace, which can for example be characterized by a 2-dimensional Cartesian plane with essentially unlimited extent in one or both of the dimensions for example, in such a way that new content can be added to the space, that content can be arranged and rearranged in the space, that a user can navigate from one part of the space to another, and that a user can easily find needed things in the space when needed.

Events: Interactions with the workspace are handled as events. People, via tangible user interface devices, and systems can interact with the workspace. Events have data that can define or point to a target graphical object to be displayed on a physical display, and an action as creation, modification, movement within the workspace and deletion of a target graphical object, and metadata associated with them. Metadata can include information such as originator, date, time, location in the workspace, event type, security information, and other metadata.

Tracking events in a workspace enables the system to not only present the spatial events in a workspace in its current state, but to share it with multiple users on multiple displays, to share relevant external information that may pertain to the content, and understand how the spatial data evolves over time. Also, the spatial event map can have a reasonable size in terms of the amount of data needed, while also defining an unbounded workspace.

There can be several different kinds of events in the system. Events can be classified as persistent events, also referred to as history events, that are stored permanently, or for a length of time required by the system for maintaining a workspace during its useful life. Events can be classified as ephemeral events that are useful or of interest for only a short time and shared live among other clients involved in the session. Persistent events may include history events stored in an undo/playback event stream, which event stream can be the same as or derived from the spatial event map of a session. Ephemeral events may include events not stored in an undo/playback event stream for the system. A spatial event map, or maps, can be used by a collaboration system to track the times and locations in the workspace in some embodiments of both persistent and ephemeral events on workspaces in the system.

Map: A map of events in the workspace can include the sum total of discrete spatial events that relate to graphical objects having locations in the workspace. Events in the map of a workspace can be "mapped" to a physical display or screen that has a displayable area referred to herein as a screen space, of specific size. A client can specify a viewport in the workspace, having a location and a dimension in the workspace, and then map the events in the viewport to the screen space for display.

Multi-User Access: One key characteristic is that all users, or multiple users, who are working on a workspace simultaneously, should be able to see the interactions of the other users in near-real-time. The spatial event map allows users having displays at different physical locations to experience near-real-time events, including both persistent and ephemeral events, within their respective displayable areas, for all users on any given workspace.

In a collaboration system, the graphical objects have a plurality of variant types. For example, the graphical objects in a single collaboration data structure used in a single session can include files such as active and static web pages, video files of various types, image files of various types including Portable Network Graphics (PNG), Joint Photographic Experts Group (JPEG), Scalable Vector Graphic (SVG), and Portable Document Format (PDF) files, and richer function files such as files created using Microsoft PowerPoint, Microsoft Word, and other presentation and word processing products. Each of the variant types of graphical objects, where the variant types have variant data structures configured to be rendered by respective rendering procedures implemented by reader programs or viewer programs having logic implemented by executable instructions including a procedure compatible with the particular variant type.

A rich content, portable, electronic document is described that can be created using a collaboration protocol, such as a spatial event map, as described herein. The electronic document can preserve a snap shot in time of content of a workspace. The electronic document is portable in the sense that it can be viewed using any platform having a browser or other resources capable of executing viewers in the electronic document, including platforms not connected with, or not participating in, the collaboration system. The electronic document can be immutable in some embodiments, so that the electronic document does not include tools by which modifications might be made.

Thus, a collaborative electronic whiteboard publication process is provided that supports the publication of a snap-shot of a collaborative workspace at a point in time in the form of a portable electronic document. The events that comprise the collaborative electronic whiteboard are stored in one embodiment in a spatial event log, also referred to herein as a spatial event map. The spatial event map can be implemented as a log of events in a database file, for use in the collaboration system. In one implementation, a spatial event map or a version of a spatial event map filtered to remove obsolete events, can be exported to a portable format such as a JSON file that is supported by standard browsers for use in the electronic document.

A network environment that supports the publication and consumption of an electronic document is illustrated in FIG. 1.

In the environment illustrated in FIG. 1, a group of collaboration clients (collaborators) in network node 151 are collaborating in a workspace on a communication network 181 using a collaboration server in network node 111 that supports in this example a spatial event log stored within a spatial event log database 113. Events that are created by the collaborators within the workspace are stored within the spatial event log database. These events comprise actions such as movement, creation, modification and deletion of graphical targets. The events can also record attributes of graphical targets including attributes such as location, size, and color of graphical targets within the workspace. The events can also record the order that graphical targets are rendered on a screen space, which allows for one graphical target to overlap all or part of another graphical target.

In the illustrated environment, an asset server in network node 121 maintains, or has access to, a data structure that represents the contents of a collaboration, such as a spatial event map, and maintains or has access to an asset database 123 which can store graphical objects linked to events (i.e. the targets of the events) in the spatial event log database 113 by resource identifiers, pointers, or other techniques. When a collaborator client renders a graphical target of an event, the object can be retrieved from the asset server in network node 121. In other embodiments, the asset database 123 can be part of the collaboration server in network node 111 which manages access to the data structure by collaborators. Thus the collaboration server can store the asset database merged with the spatial event log database 113 or stored in another database accessible by the collaboration server in network node 111. Of course, other configurations for storing the graphical objects in a network environment can be utilized.

FIG. 1 also shows a publication server in network node 131, which includes or is coupled to a publication database 133. The publication server in network node 131 can be used by a publication procedure executed or invoked by the collaboration server in network node 111, for the purposes of storing and publishing electronic documents as described herein.

The environment illustrated in FIG. 1 includes webpage servers at network nodes 161 and 171. The webpage servers can comprise for example an HTTP server at node 161, and an HTTPS server at node 171.

Also, FIG. 1 illustrates a consuming workstation at network node 141, which can be a computer having a standard browser for example, which is not authorized for participation in the collaboration, and does not include a collaboration client.

A collaborator can invoke a function to publish the workspace as an electronic document at any time. In one implementation, upon receiving a request from a collaborator at network node 151, the collaboration server on network node 111 can execute logic that processes the events in the spatial event log of the workspace, where a set of the events in the log are copied to a location within a publication database 133 on a publication server at network node 131. Assets including graphical objects that are associated with the events can also be copied from the asset database 123 to a location in the publication server at network node 131 within the publication database 133. A set of viewers is also included with the electronic document. In one example, a server, such as the collaboration server at network node 111, can then create and send a message to one or more consuming workstations at network node 141 that includes a link to the publication location. Clicking on the link at the consuming workstation at network node 141 causes the consuming workstation to download the contents of the electronic document from the publication location, and to invoke the logic included with the electronic document. The logic comprises parameters and procedures that cause the contents of the electronic document to be rendered within the screen space of the consuming workstation at network node 141.

Graphical objects having locations in the workspace can include cards, freehand writing, files of various types, and web pages from web servers such as an HTTP server at network node 161 and an HTTPS server at network node 171. In one example, a graphical target such as a Microsoft Word document or an HTTP web page is converted into a number of PNG files of different sizes and stored within an asset database 123 of an asset server at network node 121. In another example, a graphical target of an event can be an object including a web page at a an HTTPS server at network node 171 or at an HTTP server at network node 161. The publish function can include logic to query the server of a web page to determine if it is iframe capable, such as may be typical for web pages served by HTTPS servers. If so, the a graphical object for the HTTPS web page is added to the electronic document that includes a graphical frame for the web page, and a URL within an event record, to be rendered within an iframe structure.

The set of events of a workspace stored in the electronic document can include just the most recent history event for each graphical target that effects its graphical features, it dimensions or its location in the workspace. For example, a first history event for a graphical target, such as a card, can be the creation of the card in a specific location within the workspace, with a specific size and color. A movement of the card from the original location to a new location will create a second history event indicating the new location of the card. While the spatial event log can record both the first history event and the second history event, the publish process can include a filter that removes some or all of the events that are obsolete with respect to the images of the workspace to be rendered using the published electronic document. As a result of the use of the filter, the set of graphical objects included in the published electronic document may include only the second history event that describes the last location of the card. This allows the control program to render just the last description of the card, rather than the first description of the card along with the subsequent movement of the card to the second location, saving processing time and storage.

The published electronic document can include assets such as the set of graphical objects having coordinates within the workspace, a control program, location markers, and the viewers for the variant graphical object types. The electronic document can include a separate viewer for rendering each type of graphical object, as well as logic for processing actions associated with the location markers, and for processing actions identified within a toolbar and other widgets. The control program can include JavaScript, HTML, CSS, and routines for fetching and rendering data. For example, the control program can include a description of a toolbar as HTML code:

```
<div id='toolbar'>
 <div class='main-toolbar tray'>
  <i class='alt logo'></i>
  <ul class='functions'>
   <li class='exit-workspace'>
    <a class='button exit-workspace-button panel-toggle' data-panel='#exit-workspace'>
     <i class='back main-toolbar-icon' title='Exit this workspace'></i>
     <span class='main-toolbar-title'>Exit</span>
    </a>
   </li>
```

-continued

```
   <li class='participants'>
    <a class='button panel-toggle participant-list-button' data-panel='#participant-list'>
     <i class='main-toolbar-icon participants-icon' title='View a list of connected users'></i>
     <i class='badge'></i>
     <span class='count participants-count'></span>
     <span class='main-toolbar-title'>Users</span>
...
```

After executing a publish function to create an electronic document based on a workspace at a given point of time, the workspace can be republished in response to requests by any one of the collaborators at network node 151 or by other authorized programs. A republished workspace can overwrite an existing publication with a new set of data such as graphical targets, location markers, and the control program code. The republished electronic document can use the same URL or link to the publication database 133 as assigned in an earlier publication of the workspace, or can create a new link. Deleting the link to the published electronic document, or deleting the database records stored in the publication database 133, are two methods that can be used to remove a publication.

In one implementation, there are no editors included with the control program or otherwise in the electronic document, so that it has a read only form.

Clicking on the URL in the message generated by the collaboration server at network node 111 that identifies the electronic document causes the consuming workstation at network node 141 to invoke a control program within the electronic document that begins processing of the electronic document. This processing can begin with the downloading of the components of the electronic document to the consuming workstation at network node 141. The components of the electronic document can be stored in a local memory, then rendered within a screen space by the control program. Once the components of the electronic document have been downloaded, or while the components are being downloaded, a control program can begin the process of rendering the a current viewport in the workspace represented by the electronic document using logic embedded within the electronic document.

The control program can render a default viewport on a consuming workstation at network node 141. In one implementation, the default viewport can be at the 0,0 coordinates of the workspace, with a default zoom into the workspace defined by the area of the viewport in the workspace. A cookie can be used to store the most recent viewport, so that on subsequent viewing of the electronic document, the most recent location and zoom level may become the new default.

Figure 2A:
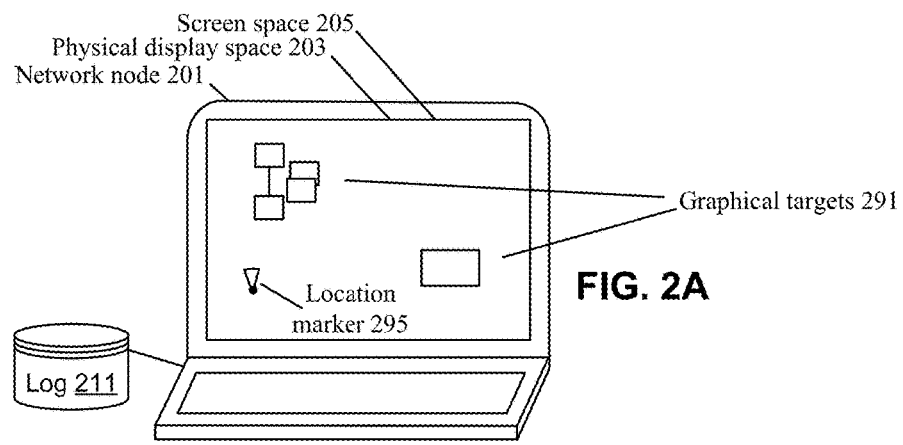
FIGS. 2A, 2B, and 2C illustrate display of a viewport in a virtual workspace in a screen space on a platform including a network node.
Figure 2B:
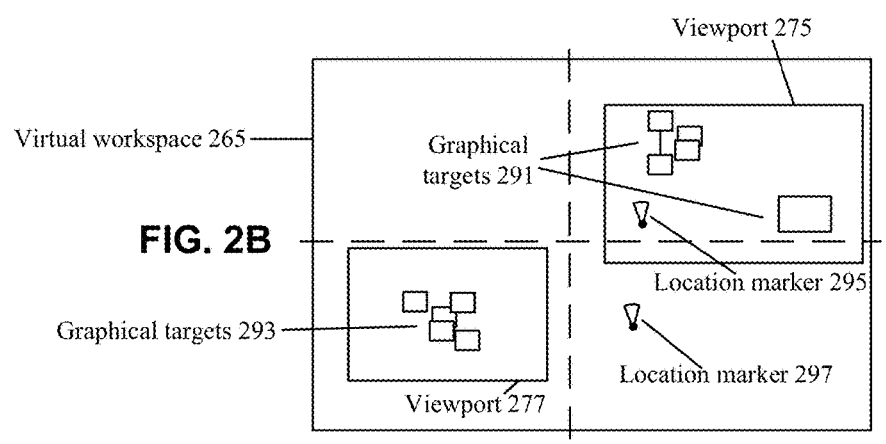
Figure 2C:
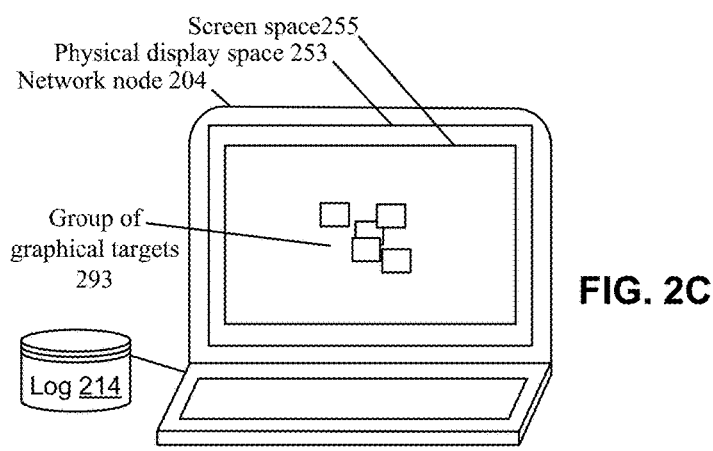

FIGS. 2A-2C show a network node displaying a portion of a workspace referred to herein as a viewport on a screen space on a display coupled to the node (FIG. 2A), a heuristic drawing of a workspace (FIG. 2B), and another network node showing a different viewport in the screen space (FIG. 2C).

FIG. 2A illustrates a first network node 201 with a physical display space 203 that includes a screen space 205 allocated for use in the collaboration session. As illustrated, the screen space 205 can be coextensive with the physical display space 203 at the first network node, or can consist of an allocated portion, like a window, in the physical display space. The physical display space has dimensions and a resolution in terms of a number of pixels and an aspect ratio set by the local network node that is independent of the workspace. The resolution in the workspace is based on the coordinate system used, and can include an essentially unbounded number of virtual points that can identify locations in the virtual workspace. In one example, the screen space 205 includes the entire displayable area of, and has the same resolution as, the physical display space 203. In another example, the screen space can be smaller than the physical display space.

In the illustrated example, the network node 201 can include touch sensors on the screen space 205 that can perform as a user input device. The collaboration client on the network node 201 can access a local log file 211 that can store event records defining a spatial event map or other type of data structure representing contents of a currently used workspace. In this example, a set of graphical objects 291, and a first location marker 295, within a current viewport for node 201 are displayed in the screen space 205.

FIG. 2B illustrates a virtual workspace 265, a first viewport 275, and a second viewport 277 that have locations and dimensions in the workspace. The plurality of graphical objects 291 (targets of events) and the graphic object of the first location marker 295, have locations within the first viewport 275. Graphical targets 293 have locations within the second viewport 277. A second location marker 297 has a location within the virtual workspace 265 outside the boundaries of both the first viewport 275 and the second viewport 277. As mentioned above, the location and dimensions of the viewports can be set at a client node.

FIG. 2C shows a second network node 204 with a physical display space 253 and a screen space 255. In the illustrated example, the network node 204 can include touch sensors that can perform as a user input device. The node can have access to a local log file 204 that can store event records defining a spatial event map or other type of data structure representing contents of a virtual workspace, such as the same workspace currently in use at the first network node. In this example, the second network node renders viewport 277 in the screen space 255. As a result of the mapping, a set of graphical targets 293 is displayed in the screen space 255.

The network node 204 of FIG. 2C could also be the same network node 201 of FIG. 2A, in which case the contents of the screen space 255 would have been changed by a process of changing the viewport for the network node. Collaboration clients include logic to interpret input signals from the touchscreen, the keyboard or otherwise, as instructions to modify the viewport, and also logic to render the screen space using the contents of the current viewport. An electronic document published as described herein includes a control program that can perform these tasks for changing a viewport.

A collaboration client can generate an event to record the creation, deletion, movement or modification of a graphical target such as a text box, a location marker, a web page, or other graphical objects within a virtual workspace. The event can include the location of the graphical target within the virtual workspace, a time of the event, and a target identifier of the graphical target. The network node can then communicate the event to other network nodes participating in the workspace. Each participating network node can store the event in its local log 211, 204. In this example, an event exists in the local log 211, 204 for each of the events creating, modifying, or moving the graphical targets 291, 293, the location markers 295, 297, and the viewports 275, 277 within the virtual workspace 265. The graphical targets of the events can be rendered on the screen space 205, 255 by a processor with logic to render the graphical targets.

The processor in a network node including a collaboration client includes logic to render graphical targets having locations in a viewport to the screen space, and to render only those graphical targets, or portions of graphical targets, that are within the boundaries of the viewport, using a zoom level that is a function of the local screen space dimensions and the dimensions of the local current viewport.

A screen space can have a fixed aspect ratio, and fixed resolution in terms of pixels per line, and lines per screen. This aspect ratio and resolution can be used to compute the mapping of the viewport to the screen space. For example, a starting viewport in the workspace can include an array of 1000 points by 1000 lines. The screen space can have the same resolution of 1000 by 1000. However, if a user executes a zoom-out operation, the screen space resolution remains the same, but the workspace resolution increases to for example 2000 points by 2000 lines. In this case, the graphical targets of the events in the larger viewport are scaled to fit within the smaller number of pixels in the screen space as a function of the zoom factor. Likewise, if the user executes a zoom-in operation, the screen space resolution remains the same, but the workspace resolution decreases to for example 500 points by 500 lines. In this case, the graphical targets of the events in the smaller viewport are scaled to fit within the larger number of pixels in the screen space. A viewport can be specified by a location in the workspace, an aspect ratio of the client screen space, and a zoom level, or ratio of resolution of the viewport compared to that of the screen space. In some embodiments, the screen space can comprise a window, such as a browser window which can be manipulated by the collaboration client or other software on the network node. Thus, if the browser window changes size and the screen space dimensions change, then the collaboration client can change the scaling of the graphical objects displayed in the screen space as well.

This allows various devices such as mobile devices, computers, and walls to display respective viewports at a common zoom level and at aspect ratios that match the respective screen spaces.

The technology disclosed allows clients to specify and change viewports independently, so that two viewports in different collaboration clients may overlap. In one example, a first user modifies a viewport so that it includes an area already included in the viewport of a second user. In this example, the viewports are independent of each other, and one viewport can be modified without affecting the other. A viewport can be changed by interpreting input data to change one or more of a zoom level, an aspect ratio and a location where the input data can be generated by using, for example, a variety of input devices and gestures, including, for example, a zoom wheel on a mouse, or combinations of keys pressed on a keyboard. A viewport change input data can also be generated using a touch screen or mouse gesture that includes "grabbing" a location on the screen space with a mouse or other pointer, and then moving the mouse. Also, viewport change data can be received in messages from remote nodes or from procedures executed by the network node other than the input data processing.

A display is a device comprised of an array of pixels. Complex displays, such as walls, comprise multiple displays in a rectangular array, and have consecutive pixels in the X and Y coordinates managed by a controller. In one implementation, a display can have multiple windows, each window comprising a separate screen space.

For example, a workspace can have a set of objects laid out between coordinates x0=−10000, y0=4500 and x1=5200, y1=−1400, in abstract units. If a client wants to see that set of objects, then it defines a viewport with those coordinates, and then renders that viewport within its screen space, mapping the abstract units of the workspace to the physical units of displayable pixels. If the client wants to see more of the workspace, they can zoom out so that more distributed x0, y0, x1, y1 coordinates of the viewport map to the available space in the screen space. If they want to see a smaller area of the workspace, they zoom in to whatever x0', y0', x1', y1' coordinates they want, and those coordinates are mapped to the screen space of the client. In rendering the viewport to the screen space, scaling of the contents of the viewport can be accomplished through standard graphical scaling techniques.

A change to a viewport can be an event in a spatial event map system which, in this example, causes a "vc" (Viewport Change) record to be created, stored in the local log, and communicated to other participant clients in the collaborative workspace. An example of a "vc" record for use in an API like that described below, is represented as follows:

```
// server <--> client
[sender-id, "vc", viewport-rect]
``` viewport-rect an array in the form [x1, y1, x2, y2] representing the corners of a section of the workspace being used as the viewport on the sending client.

Other network nodes participating in the collaborative workspace can receive the "vc" record, where it can be stored in the local log. The other network nodes will not act on the "vc" record unless they invoke logic to follow the network node that generated the "vc" record.

The technology disclosed allows clients to publish an electronic document as discussed above that preserves a version of the workspace as of the time that the publish procedure is executed.

FIG. 3A is a flowchart illustrating a process for the creation of an electronic document. To publish an electronic document, the network node stores a local log 211 of graphical objects of variant types having locations in a workspace. In an embodiment of a collaboration system described herein, the log of graphical objects can comprise a spatial event map, or spatial event log stored in a database, such as database 113 in the network configuration of FIG. 1. In other examples, different data structures and different network configurations for storing the contents of a collaboration workspace can be utilized.

A publish function is invoked for the workspace (221). The publish function can be invoked locally in response to user input, or by a collaboration client at a different network node that sends a message received at the node which executes function. In a network configuration like that shown in FIG. 1, the publish function can be executed by the collaboration server at network node 111.

The publish function can filter the log of graphical objects to remove entries that are obsolete with respect to a current state of the workspace (231). For example, in a spatial event log there may be events that create, modify or move graphical targets in the workspace, where the graphical targets include the graphical objects in the log, and some of the events have been superseded or rendered obsolete by later events. Only those events which contribute to the current state of the graphical objects in the workspace are needed for the electronic document. In other examples, the entire log can be included in the electronic document, enabling the consumer of the electronic document to review changes in the contents of the workspace over time. In yet other examples, the filter can remove entries that are obsolete with respect to the state of the workspace as it evolves over a certain time window.

For the purposes of the electronic document, a set of graphical objects identified by the filter is stored (241). As mentioned above, in alternative systems the filter is not applied, and all the graphical objects identified by the log of graphical objects can be included in the set.

A set of viewers is added to the set of graphical objects, for the variant types of graphical objects included in the set selected for the electronic document (251). The viewers are included in the electronic document in order to enable a wide range of platforms to act as a consuming network node. The platforms which may act as a consumer network node may have no viewers, or only some of the viewers necessary to handle particular types of graphical objects. Thus, a portable electronic document is provided by including viewers as part of the electronic document itself.

In addition, a control program, including a set of instructions for producing a sequence of images using the contents of the electronic document, and for navigating the workspace at a consuming network node is added to the electronic document (step 261). An example of a control program added by the step 261 is described with reference to FIG. 3B.

The publish function can also produce a filename, or identifier for the electronic document. In one embodiment, the identifier is a universal resource locator URL. The network node can be configured with logic to send the identifier of the electronic document to consumer network nodes, or to send the identifier to a collaboration client at a network node that had requested invocation of the publish function.

The order illustrated in the simplified flow diagram in FIG. 3A is provided for the purposes of illustration, and can be modified as suits a particular implementation. Many of the steps, for example, can be executed in parallel.

FIG. 3B is a flowchart illustrating logic for producing a sequence of images that is implemented using executable instructions that are part of an electronic document produced according to FIG. 3A. The control program included in the electronic document includes logic to determine a current viewport defining an area within the workspace (block 311). In one embodiment, an initial viewport specification, such as its location and dimensions in the workspace, is included in the URL that identifies the electronic document. The electronic document includes logic to use the initial viewport specification as the current viewport when the electronic document is opened, or when a default viewport is otherwise requested.

The control program in the electronic document also includes logic to determine the dimensions of the screen space at the consuming node (321). In one embodiment, the screen space consists of the area on the physical display of a browser window. The consuming node may include the ability to change the dimensions of the browser window, and thereby change the dimensions of the screen space, while viewing the electronic document.

The control program includes logic to identify a subset of graphical objects in the set of graphical objects that are provided in the electronic document, that overlap with the defined area of the current viewport (331). This can be accomplished by traversing a log or list of the graphical objects included in the set, which includes their locations in the workspace, and selecting those graphical objects that are located in the current viewport.

The control program includes logic to invoke viewers for the subset of graphical objects that lie within the current viewport to render a current image in the screen space, including in combination the subset of graphical objects of the current viewport (341). The control program can include instructions which, when executed with the viewers, apply a scale factor in the rendering of the graphical objects in the identified subset, which is a function of the dimensions of the current viewport and the dimensions of the current screen space.

A control program includes logic to create a sequence of images, as changes in the current viewport or in screen space occur. Thus, the control program includes logic to wait for input changing the current viewport, and for input in some embodiments changing the current screen space (351). If no such input is received, then the control program can wait for such input. If input is received, then the control program will look back to block 311. The input can be provided by a user input device at a consuming network node, such as mouse gestures, touch screen gestures, keyboard entry, and the like, which are interpreted as commands to change the viewport, and change the screen space.

The electronic document can be implemented in a read-only format, by which the contents of the document are not alterable using instructions in the electronic document, or in a typical workstation. Also, the format of the ED may inhibit changes by making it hard to find the images, and other techniques may be used.

The order illustrated in the simplified flow diagrams in each of FIGS. 3A and 3B is provided for the purposes of illustration, and can be modified as suits a particular implementation. Many of the steps, for example, can be executed in parallel.

Figure 4:
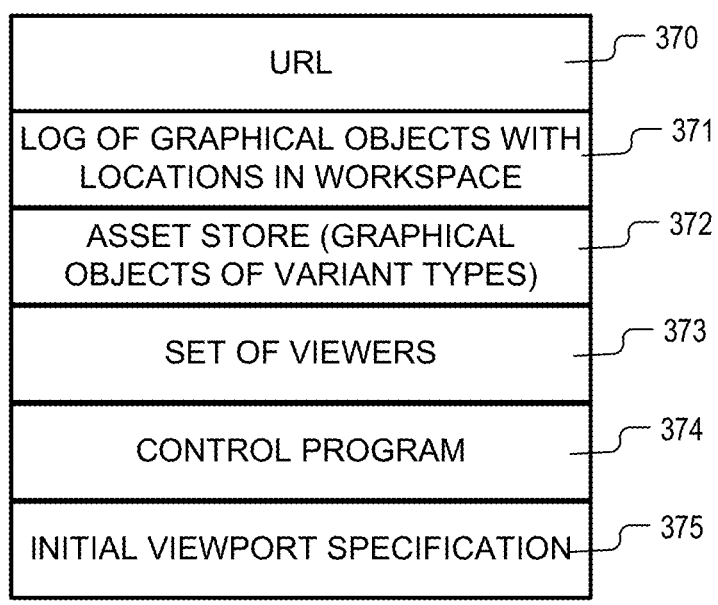
FIG. 4 is a schematic illustration of an electronic document generated according to the process of FIG. 3A.

FIG. 4 is a simplified diagram of an electronic document produced according to the process of FIGS. 3A and 3B. The electronic document is a data structure identified in this example by a URL (370). Also, the electronic document includes a log of graphical objects with locations within a workspace (371). An asset store including graphical objects of variant types is part of, or linked to, the electronic document (372). For example, the graphical objects in the asset store can be locally included with the electronic document as it is provided to consumers. In other examples, the asset store may be maintained in a publication server or "cloud" based memory services, and the electronic document will include links to the graphical objects in the asset store with logic to download the graphical objects as needed for rendering an image of a current viewport. A set of viewers (373) is included in the electronic document to support portability of the document as discussed above.

The control program (374) is included with the electronic document to enable navigation of the workspace and production of a sequence of images as changes in the current viewport or in the current screen space occur. The control program can also provide tools to assist navigating the workspace by changing the current viewport, including location markers and zoom buttons, discussed below with reference to FIGS. 5A-5F.

Also included in the electronic document is an initial viewport specification (375). This viewport specification can also be a default viewport specification. As mentioned above, the control program includes logic to use the initial or default viewport specification as a current viewport when the electronic document is opened. Also, in some embodiments, the initial viewport specification is included in the URL.

An example of an electronic document is described with reference to FIG. 4. The electronic document comprises a data structure stored in non-transitory computer readable memory, including storage units that store elements of the electronic document. It can also include security features, such as a checksum. In an embodiment in which the log in the electronic document comprises events in a spatial event map, links in the events to the graphical targets of the events can be modified by the publish function to link to the versions of assets which are part of the electronic document.

The electronic document can be encrypted or compressed, or otherwise encapsulated. Non-transitory computer readable memory includes non-volatile and volatile memory deployed in or accessible by a computing platform that can parse and execute the electronic document. Some examples of non-transitory memory include cloud based memory, memory accessible via networks including local area networks and wide area networks, memory accessible via the internet, integrated circuit memory, magnetic disk memory and optical disk memory.

Figure 5A:
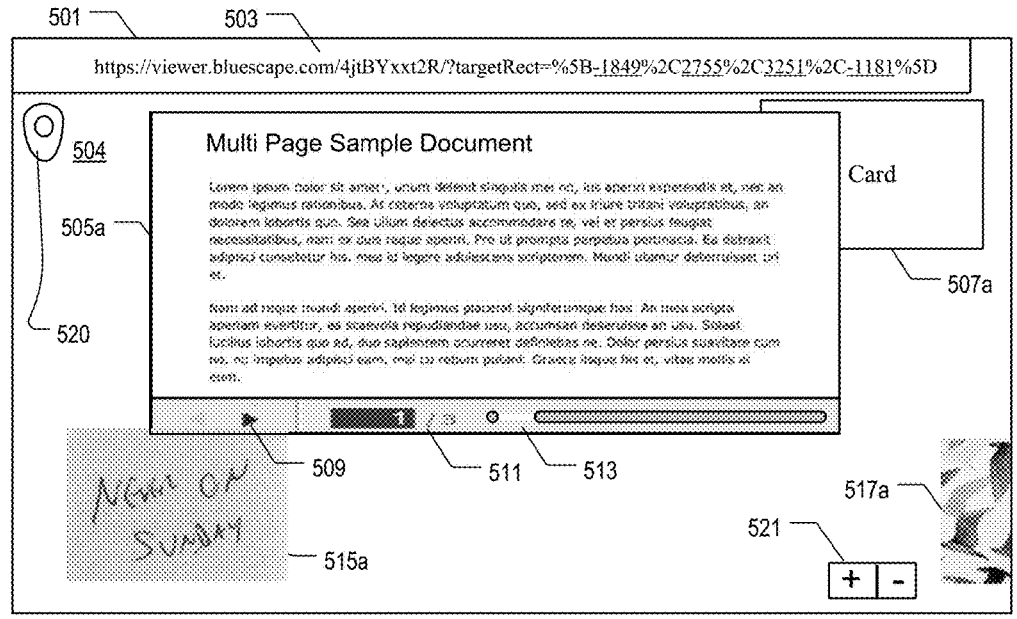
FIGS. 5A and 5B show images in a screen space produced using an electronic document as described herein, with different viewport specifications.

In FIG. 5A, an image of contents of a default current viewport 504 of an electronic document is shown as rendered within a browser window 501 which acts as the screen space. The default viewport 504 is described within a URL 503 for the page. In this example, the default viewport 504 contains images of graphical objects such as a "Multi Page Sample Document" 505a, a hand-drawn note 515a, drawn on a screen space during a collaboration session, a card 507a, containing typed text of various colors, and a bird image file 517a.

Figure 5B:
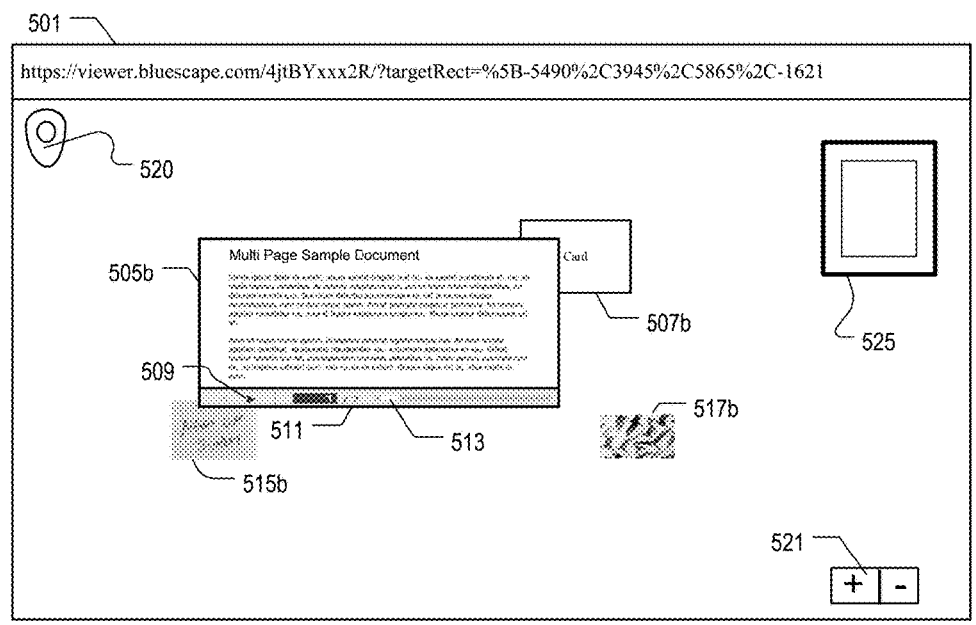

FIG. 5B shows the graphical targets described in FIG. 5A where the zoom level has changed, including images of graphical objects including a "Multi Page Sample Document" 505b having a different screen space size, a hand-drawn note 515b having a different screen space size, a card 507b having a different screen space size, containing typed text of various colors, and a bird image 517b.

The different zoom level is represented in the viewport specification in the URL, which shows different targetRect coordinates for the viewport rendered within the screen space 501.

The rendering of the graphical targets within the screen space 501 is done by the control program in the electronic document, which in this example is embedded within JavaScript code included within the electronic document. The new targetRect variables can be stored in a cookie, so that the viewer can return to the modified viewport coordinates in subsequent sessions.

Figure 7:
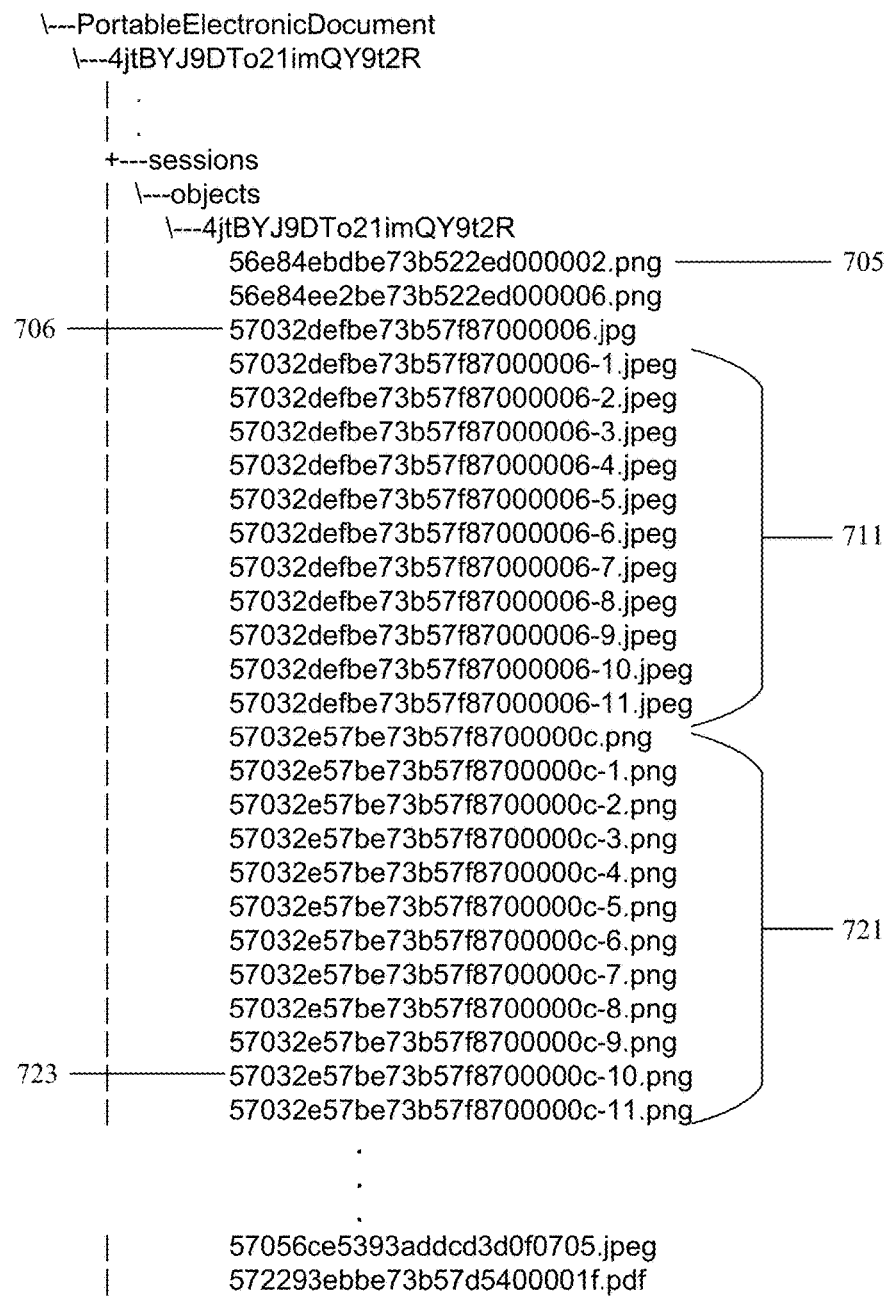
FIG. 7 illustrates an example of asset files within the electronic document that are used to render the graphical objects.

In another example, a graphical target such as the bird image 517a, can be represented by a single image file, such as "56e84ebdbe73b522ed000002.png" 705 as illustrated in FIG. 7, without having multiple images of different sizes generated for rendering. In this example, the bird image 517a file is a JPEG file, but it can also be in another format such as PDF, PNG, SVG, GIF, or TIF.

Variables such as size, location, content, and color for the graphical target of type card 507a can be stored within the history record. The viewer contains a card viewer module to process the contents of the history record for the card 507a, and render the card within the screen space. In one implementation, a card is a graphical target used to store typed text. The card viewer module renders the graphical target on the screen. With other graphical target types, such as the viewer module that renders a multi-page document, the module can be more complex.

The default viewport 504 is specified by coordinates embedded within the first URL 503 in this example, which can be described as a "targetRect". The targetRect in the first URL 503 is defined by four variables: left, top, right, bottom, which in the following example would be the Cartesian coordinates (−1849, 2755), (3251, −1181);

```
https://viewer.bluescape.com/4jtBYxxxxxxxt2R/?targetRect=
  %5B-1849%2C2755%2C3251%2C-1181%5D
```

Also shown in the browser window are navigation tools associated with the electronic document, including a location marker widget 520 and a zoom +|− widget 521. The navigation tools are part of the control program included in the electronic document. Clicking on the a zoom +|− widget 521 causes the area of the current viewport to increase or decrease, which has the effect of a zoom function on a typical image, as the size of the area in the workspace changes relative to the size of the screen space. Thus, as shown in FIG. 5B a larger viewport is encompassed by the display image than that shown in FIG. 5A. As result of the larger viewport, while the browser window size does not change, the graphical objects appear relatively smaller, and additional graphical objects, such as the webpage frame 525 can be encompassed within the enlarged viewport. Also, the complete bird image 517b which was only partly shown (517a) in the default viewport shown in FIG. 5A can be encompassed within the enlarged viewport and shown in the resulting image rendered by the control program in the electronic document.

Figure 5C:
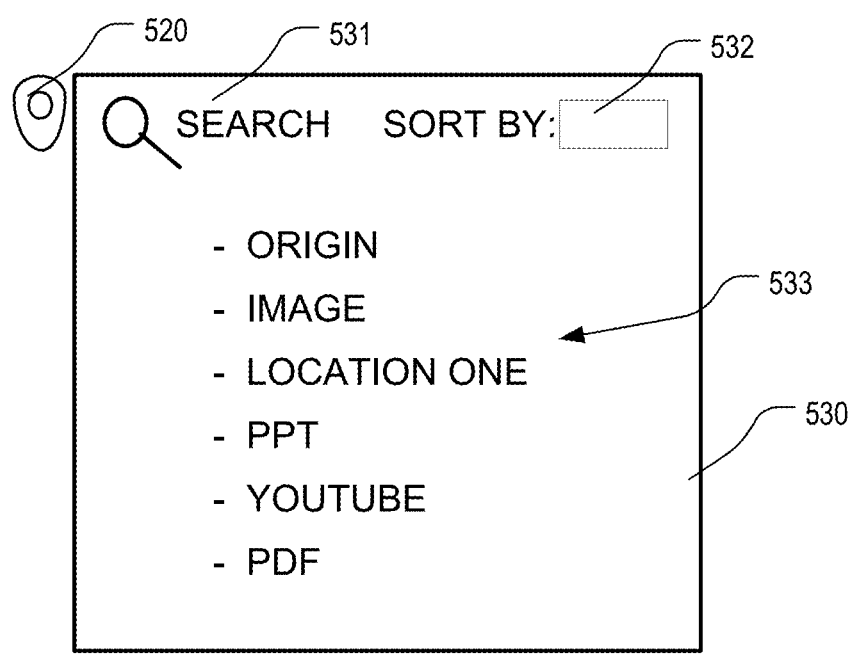
FIG. 5C shows a location marker pull down menu produced using instructions included in an electronic document as described herein.

For a location marker widget 520, selecting the widget results in display of a pull down menu 530 as shown in FIG. 5C. The pull down menu 530 in this example includes a search widget 531, which when selected opens a search tool that allows for searching the names of location markers by text searching. Also, the pull down menu 530 in this example includes a sort widget 532, which when selected enables selecting a sort key, such as time of creation, alphabetical, and so on for displaying the list 533 of location markers. Selecting a location marker in the pull down menu 530 causes a change in the current viewport specification, to a new viewport which encompasses the location marker selected. The new viewport can maintain the aspect ratio and size of the current viewport, while being positioned with the location marker in the center for example. Alternatively, the new viewport can change to different dimensions which might be associated with the location marker itself.

The list of location markers, included in the pull down menu 530, can be created by the publish function as discussed above, which includes logic to identify the location markers in the workspace, and include them in the set of graphical objects for the electronic document.

Referring to FIG. 5A, one of the graphical objects illustrated is a paged image 505a. This construct can be used to address the need to include images of complex file types in the electronic document. For example, some types of paged graphical objects are parts of native file types produced using word processing, presentation creation, spreadsheet, and other complex document creation programs. These types of paged objects can require expensive and/or proprietary viewers for working with the native file type. Thus, in an embodiment of the publish function described herein, paged graphical objects from the native file can be converted into a paged image object. The publish function can include logic to produce a plurality of page images of pages of the native file type and a graphical frame progress bar 513 for the page images.

The viewer for the paged image graphical object uses a graphical frame as discussed above which includes navigation widgets such as a set of arrows 509 for paging through the multi-page document. In this example, only the right arrow is available to be clicked as the multi-page viewer module is rendering the first page of a multi-page document. There is also a page number indicator widget 511 that shows the current page number of 1 of 3 pages, and a progress bar 513 that shows the relative page on a horizontal scale.

By selecting the page change widget, different page images are presented within the graphical frame 505a using logic within the control program of the electronic document. Also, the page number is updated within the page number widget 511a using logic within the control program.

Figure 5D:
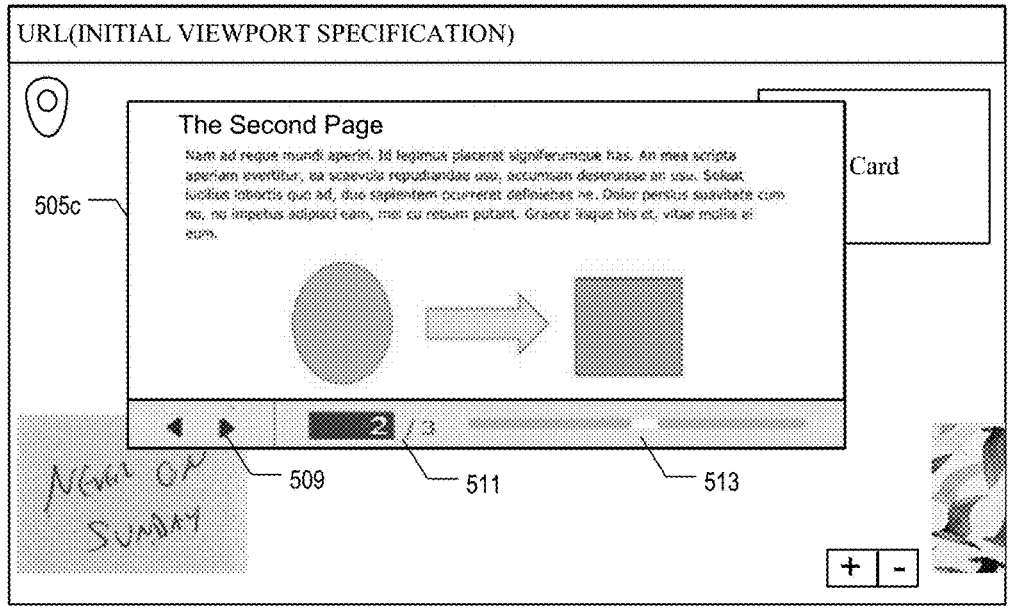
FIGS. 5D and 5E illustrate a page change function of a viewer module for a paged image graphical object.
Figure 5E:
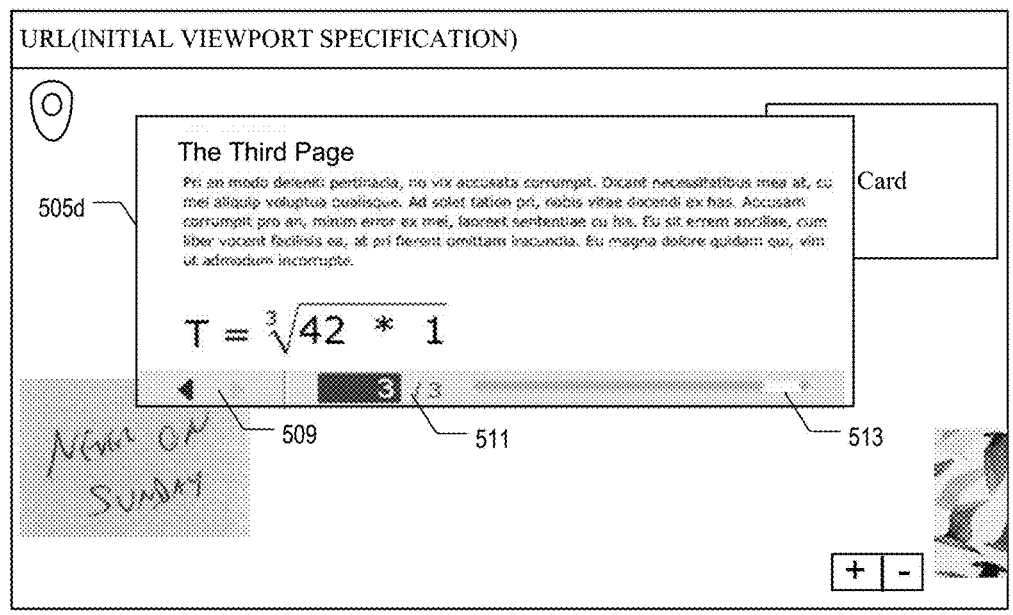

FIG. 5D shows the graphical frame 505c with a second page image displayed therein, and updates to the page navigation widgets for the second page. FIG. 5E shows the graphical frame 505d with a third page image displayed therein, and consequential updates to the page navigation widgets for the third page.

For example, a paged graphical object converted by the publish function for display within the frame 505c, can be a Word document. The Word document has been converted to a set of image files by the publish function, and stored in the asset server at network node 121, and collected to form part of the electronic document stored in the publication database 133. In one example, each page in the original Word document is converted to a jpg file. The conversion allows the rendering of an un-editable image of the Word document that can be viewed using a simple viewer in the electronic document executed within a browser window, without requiring the consuming platform to have a program for rendering Word files.

FIG. 5E illustrates the same viewport as is illustrated in FIGS. 5A and 5D, but after the right arrow 509 has been clicked in FIG. 5C. In this example, "The Third Page" 505d of the three-page multi-page document is being displayed. Since there are no subsequent pages, the multi-page viewer module had modified the graphical target so that the right arrow 509 cannot be clicked. The left arrow 509 can be clicked, which would then cause the previous page in the multi-page document to be rendered. The page indicator 511 shows that page 3 of 3 is being displayed, and the progress bar 513 shows that the rendered page is at the end of the multi-page document.

Figure 5F:
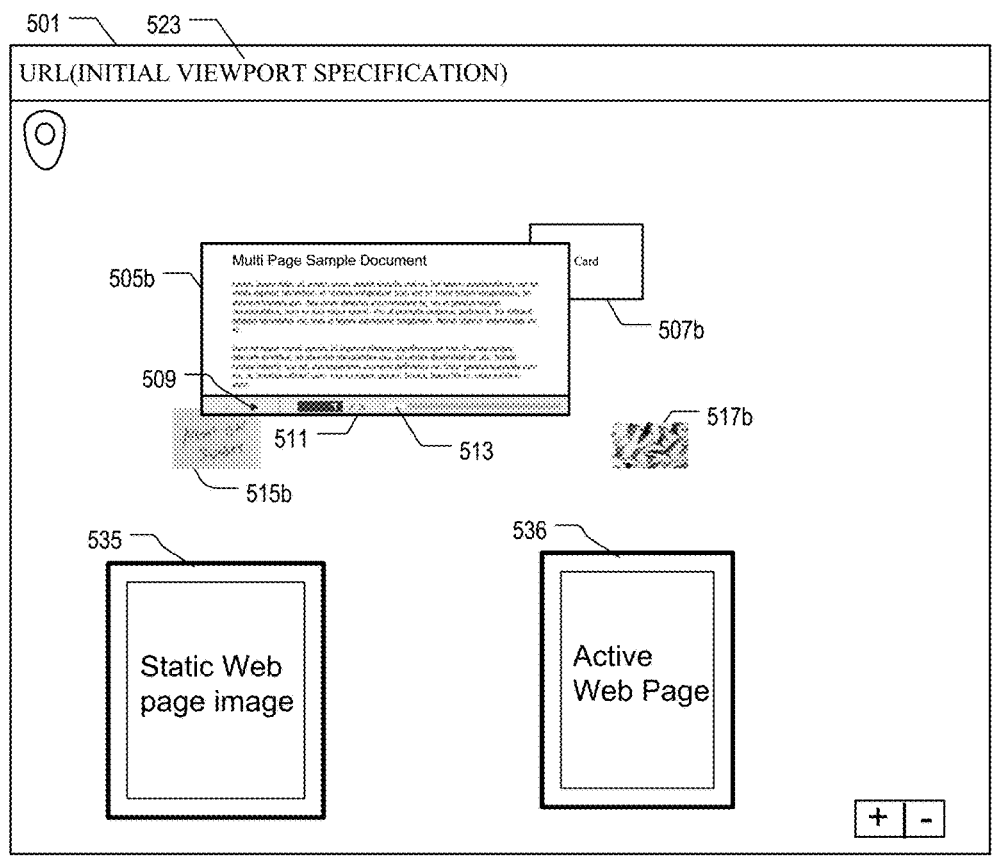
FIG. 5F shows imaged of active and static webpage graphical objects produced using an electronic document as described herein.

FIG. 5F illustrates a screen space in which a viewport includes a static webpage object 535 and an active webpage object 536. These graphical objects 535, 536 are created by the publish function when a graphical object in the workspace being published comprises a webpage. For a static webpage object 535, the publish function captures an image of the webpage at the time the publish function is executed, saves the image and associates that image with a webpage frame for a static webpage object 535. For webpages which have active content that is intended to be captured by the graphical object for the electronic document, the publish function uses in in-line frame, such as the iframe nested browsing context described in the W3C Working Group Note, "iframe—nested browsing context," HTML: The Markup Language (an HTML language reference), or uses similar construct to embed the webpage within the frame. Thus, the publish function can include logic to determine for webpages embedded in the workspace whether they can be used as an active webpage object 536, which for the example using iframes, determines whether the webpage supports this function.

The electronic document comprising the graphical targets and assets, and the viewer modules that manipulate them, are illustrated in FIGS. 6 and 7.

FIG. 6

FIG. 6 illustrates an example of a portion of an electronic document. "4jtBYJ9DTo21imQY9t2R" 603 is the name of the electronic document, which is generated by the collaboration server at network node 111 at the time of publication. The document name is used as the name of the root node within the publication database 133 that holds the files that comprise the electronic document, and is included in the link generated by the collaboration server 446. If a name is re-used by the collaboration server, the publication is considered to be a re-publication. The collaboration server contains logic that allows the reuse of document names.

The file "index.html" 615 is the default HTML document processed by the browser window that is invoked by the clicking on the link within the message to the one or more consuming workstations at network node 141 that is a link to the publication location. Index.html 615 can include a link to the control program code 619 which, in this example, includes the following:

```
<script src='scripts/configuration-
2641ce895f3b6b9edd99ff86feb037ef.js'></script>
    <script src='scripts/templates-
    3feff1f707d3ae83cac53c43132a2f0c.js'></script>
    <script src='scripts/externals-
fe7f3c5a6add2f694512b244514d9977.js'></script>
    <script src='scripts/application-
bf2c0ecbbb3df546359dde701a19c384.js'></script>
```

The file configuration-2641ce895f3b6b9edd99ff86feb037ef.js contains the configuration and service end-point settings for the viewers and the control program, and the control program. For example:

```
window.buildNumber="v1.7.0-xxxx-gxxxxxxx",
window.configurationServiceEndpoint="./local.json";
```

This setting instructs the viewer to load ./local.json 611, which can contain the following configuration information:

```
{"readonly":{"session_id":"4jtBYJ9DTo21imQY9t2R ",
"history_url":"history","history_object_url":".",
"screenshot_object_url":".","session_name":"e157069"}}
```

The file templates-3feff1f707d3ae83cac53c43132a2f0c.js contains template code for each type of widget, and toolbar functions. In this example, the templates can comprise HTML and JavaScript code identifying the format of the widgets and toolbars, and their functionality. A widget can include a definition of processing for each graphical target, and an outline of how the graphical target is rendered within the screen space.

The file externals-fe7f3c5a6add2f694512b244514d9977.js includes external third party JavaScript libraries used by the viewers and the control program.

The file application-bf2c0ecbbb3df546359dde701a19c384js is the viewer, which includes viewer modules.

There is also a file "application-8d9c1c76318f0dac61b4b640ef690648.css" that is a CSS 605 (Cascading Style Sheet) file that defines attributes such as the format and position of the HTML objects within the screen space used to display the viewport, such as headings, icons, and links for help. The HTML objects allow the consumer of the electronic document to interact with the electronic document using tools such as a location marker menu for selection of a location marker.

The control program code 619 identified in index.html 615 comprises the logic that renders a viewport and toolbars within the screen space, and allows manipulations of the viewport such as panning, zooming, and jumping to a location marker. As the control program code 619 is loaded by the index.html file, the control program code 619 prepares the screen space so that it can render the default viewport of the workspace. The control program code 619 includes a module to parse the assets.json 607 file, which contains assets such as icons and gifs used by the viewer. The objects within the assets.json file can be different than the assets stored within the asset database 123. For example, an asset.json object can be an icon of an arrow pointing upward that is associated with a selectable button within the viewer. When a click on the arrow is received by the viewer, logic within the control program can move the viewport upward within the screen space. These icon and gif files can be independent of the workspace, and can include objects such as:

```
"images/toolbar/checkmark.png":"bdaa35d546bd7924e41d19676030ddd8"
"images/toolbar/icon-redo.png":"f5c3b3b4b0874b8828f3261ee71d4a27"
"images/how_to/benefit_1_oldlogo.gif":
"ac3ee9eccd9b429b49f719ef1363f2eb"
"images/disk-icon.png":"31eb45cb9474a79bb2267288cb75d6e2"
```

Once the control program code 619 has configured the screen space for the rendering of an electronic document, modules within the control program code 619 begin to process the components of the electronic document. The control program code 619 includes a module to parse the toolbar 623 directory for objects such as clocks, location markers, and how-to instructions.

The control program code 619 also includes a module to parse the local.json 611 file to identify workspace metadata available to the viewers or other parts of the control program. The control program has a module to process each of the workspace metadata elements identified within the local.json 611 file. The file "local.json" 611 can describe metadata for the workspace that is available to the control program. The metadata can include instructions to the control program that the workspace is to be rendered as read only. The metadata can also include a session ID, a name of a file containing the HE records, a session name, and the name of the file containing URL information, as in the following example:

```
{"readonly":{
"session_id":"4jtBYJ9DTo21imQY9t2R",
"session_name":"Diyu's test",
"history_url":"history.json",
"metadata_url":"urlMetadata.json",
"history_object_url":".",
"screenshot_object_url":"."}}
```

In this example, the local.json 611 file contains metadata on the session_id, the session_name, the history_url, and the metadata url. In this example, no metadata is included for a history_object_url or a screenshot_object_url. Logic within the control program code 619 first registers the session_id of "4jtBYJ9DTo21imQY9t2R" as the root of the objects created within the control program code 619. The session_name of "Diyu's test" is set as a variable within the control program code 619, and is displayed within the screen space as an identifier. A module within the control program code 619 parses the history.json 609 file to discover the history events that comprise the workspace. The control program code 619 also includes a module to parse the urlMetadata.json 613 file to discover the URLs that were embedded within graphical targets within the workspace. In another example, modules to parse other metadata objects can be included with the control program code 619.

The file "history.json" 609 is where the HE (History event) records identifying the set of the graphical object within a workspace are stored. History Event (HE) records can include graphical targets of events such as cards, images, documents, spreadsheets, PDF files, videos, web pages, and free form graphics. For example, a HE record for a card can describe a rectangle of a specific location, size, and color containing text. In one example, a HE record within history.json 609 for an image can contain the following information:

```
["57032d2bd9528e520e986e31","he","4jtBYJ9DTo21imQY9t2R","57032e589cb
450c30a1bbe0b", "create", {"baseName":
"sessions/objects/4jtBYJ9DTo21imQY9t2R/57032e57be73b57f8700000c",
"rect":[4354,-1966,4487,-1866],"order":17,"strokes":[ ], "actualHeight":100,
"actualWidth":133,"ext":"PNG","hidden":false,"originalname":"Clipboard_Image
_20160404_200421.png","id":"57032e57be73b57f8700000c","type":"image","actor
Id":"5674","actorType":"OAuth"}],["57032d2bd9528e520e986e31","he","5703
2e57be73b57f8700000c","57032e5cad8358520e12e4ca","position",{"order":17,"rect
":[4354,-1966,4736,-1679],"actorId":"5674","actorType":"OAuth"}]
```

In this example, a HE record describes the creation of a rectangle at coordinates [4354, −1966,4487, −1866] within the workspace, and then rendering within those coordinates the object ":"sessions/objects/4jtBYJ9DTo21imQY9t2R/57032e57be73b57f8700000c", which is the bird image file 517a and 517b rendered in FIGS. 5A and 5B, respectively, and the bird image file 721 described in FIG. 7. The "order" variable shows this to be the 17$^{th}$ graphical target to be rendered within the viewport, which can define which graphical target is in the foreground when two or more graphical targets overlap within the viewport.

In another example, the control program code 619 can support the rendering of a web page within a graphical target. The file "urlMetadata.json" 613 stores a description of the web pages created and stored within the workspace. In one example, if allowed by the server managing a web page, the web page can be rendered automatically within an iframe. For example, www.nike.com can be rendered automatically within an iframe. The URL for www.nike.com is stored in the urlMetadata.json 613 file:

```
"57152c1dbe73b5581d000018":{"url":"https://www.nike.com/us/en_us/",
"fetched":true, "iframeAllowed":true,"targetId":
"57152c1dbe73b5581d000018"}
```

In this example, the HE record stored in history.json 609 for the object 57152c1dbe73b5581d000018 describes a graphical target within the workspace with coordinates [4196.021419852121, 386.9267357235863, 4939.767032296317, 897.3404081798735]. A URL module within the control program code 619 can render an iframe at these coordinates, then invoke www.nike.com as an iframe within the graphical target:

```
["572267b902fd7e1645ed6797","he","57152c1dbe73b5581d000018",
"57227f5a331ced16458c9373","position",{"rect":
[4196.021419852121,386.9267357235863,4939.767032296317,
897.3404081798735],"order":29,"actorId":"zBDfyHZx5BC
mBJh6ms2x","actorType":"publicKey"}]
```

In another example, a server managing a web page will not support the automatic rendering of the web page into an iframe when authentication is required to view the web page, such as with Google Docs. In this example, the url object 5706a766be73b52b31000017 from urlMetadata.json 613 does not allow the automatic rendering of the web page within an iframe:

```
"5706a766be73b52b31000017":{"url":"https://accounts.google.com/ServiceLogin
?service=wise&passive=1209600&continue=https%3A%2F%2Fdocs.google.com
%2Fpresentation%2Fd%2F1DO8dSlmDWYz0pkuseyRsEjxT1GPaMUIotYpFW
VMkLi8%2Fedit%3Fusp%3Ddrive_web&followup=https%3A%2F%2Fdocs.google
.com%2Fpresentation%2Fd%2F1DO8dSlmDWYz0pkuseyRsEjxT1GPaMUIot
YpFWVMkLi8%2Fedit%3Fusp%3Ddrive_web<mpl=slides#identifier","fetched
":false,"iframeAllowed":false,"targetId":"5706a766be73b52b31000017"}
```

The HE record associated with the url object 5706a766be73b52b31000017 shows connection information for the URL:

["572267b902fd7e1645ed6797","he","5706a766be73b52b31000017","572278383
31ced16458c9206","tsxappevent",{"targetTsxAppId":"webbrowser","payload":{"
version":1,"url":"https://accounts.google.com/ServiceLogin?service=wise&passive
=1209600&continue=https%3A%2F%2Fdocs.google.com%2Fpresentation%2F
d%2F1DO8dSlmDWYz0pkuseyRsEjxT1GPaMUIotYpFWVMkLi8%2Fedit%3Fusp
%3Ddrive_web&followup=https%3A%2F%2Fdocs.google.com%2Fpresentation
%2Fd%2F1DO8dSlmDWYz0pkuseyRsEjxT1GPaMUIotYpFWVMkLi8%2Fedit
%3Fusp%3Ddrive_web<mpl=slides#identifier"},"messageType":"navigateTo
","actorId":"zBDfyHZx5BCmBJh6ms2x","actorType":"publicKey"}]

In this example, when iframes are not used, instead of the URL being rendered within the viewport, a file such as googledocswidget_presentation_published.png 636 is displayed within the boundaries of a frame including in the graphical object. However, the screenshots 627 folder contains screenshot files 635 that can also be used when an iframe-enabled web widget graphical target is unselected (click away).

The objects 645 folder can contain the assets associated with their identifiers in the assets.json 607 file. A more complete list of objects 645 is described in FIG. 7.

FIG. 7 illustrates an example of asset files within the electronic document data structure that are used to render some of the graphical targets in FIGS. 5A, 5B, 5D, and 5E. FIG. 7 includes the bird image 517a file "56e84ebdbe73b522ed000002.png" illustrated in FIG. 5A. FIG. 7 also includes the original image for the "Multi Page Sample Document" 505a as illustrated in FIG. 5A titled "57032defbe73b57f87000006.jpg" 706. Also included are 11 additional instances of the original image in different sizes 711, which are named "57032defbe73b57f87000006-1.jpg" through "57032defbe73b57f87000006-11.jpg".

FIG. 7 also includes the file set 721 used to render "The Second Page", including "The Second Page" 505c in FIG. 5C that uses the file "57032e57be73b57f8700000c-10.png".

For example, when the collaboration server at network node 111 receives an instruction to publish the workspace, 11 additional jpeg files were created, starting with "57032defbe73b57f87000006-1 jpeg", the smallest size conversion of the original jpg file, and ending in "57032defbe73b57f87000006-11.jpeg", the largest size conversion of the original jpg file. Zooming into, and out of, a viewport can cause the graphical targets to grow, and shrink dramatically within the screen space 501. Since there can be more granularity in the zoom function than there are jpeg images, an interpolation between two proximal jpeg images at a selected zoom level can be used. In this example, the default viewport zoom level for the first page of the multi-page sample document 505a aligns with an image "57032defbe73b57f87000006-10.jpeg", where "–10" illustrates the image file to use at that zoom level. Thus, the control program in the electronic document can include logic to set the scale factor for a graphical object, including for a page in a paged image document as a function of the dimensions of the viewport and of the dimensions of the screen space, and to use the set of images to select an image to be used, either as is, or after interpolation using more than one selected image. The publish function includes logic to produce a set of versions of the image file for some or all of the variant graphical object types, each member of the set having a different resolution for a screen space, and the viewer in the electronic document for the image file includes logic to select a member of the set of version as a function of the dimensions of the viewport in the workspace and the dimensions of the screen space.

FIGS. 5D and 5E illustrate a page change function of the multi-page viewer module responsible for rendering the multi-page document, and are within the same viewport as FIG. 5A. In this example, "The Second Page" 505c is being rendered by the multi-page viewer module after the right arrow 509a has been clicked on the "Multi Page Sample Document" 505a. At this zoom level, "The Second Page" 505c is rendered from the file "57032e57be73b57f8700000c-10.png" 723 illustrated in FIG. 7. In FIG. 5D, the multi-page viewer module has rendered left and right arrows 509c, where the left and right arrows are both available to be clicked, indicating that "The Second Page" 505c has at least one page before it, and one page after it. In this example, clicking on the left arrow would replace page 2 with page 1, which would return the viewer to FIG. 5A. Clicking on the right arrow would replace page 2 with page 3 of the multi-page document. There is also a page indicator 511c showing that page 2 of 3 is being displayed, and a progress bar 513c showing that the rendered page is in the middle of the set of pages within the graphical target.

Following is an example of HTML code from the multi-page viewer module that uses the assets shown in FIG. 7:

```
<div id="container" style="-ms-content-zooming: none; -ms-user-select: none; -ms-touch-
select: none; touch-action: pan-y; -webkit-tap-highlight-color: rgba(0, 0, 0, 0);">
    <div class="gesture-target" id="tiles"><canvas width="1696" height="245" style="width:
1257px; height: 182px;"></canvas></div>
    <div id="widgets"><div class="ui_contextmenu ui_groupdocument"
id="57032defbe73b57f87000006">
  <div class="navigate-container" style="left: 286px; top: 145px; width: 801px; display:
table;">
    <div class="button-navigate">
    <button name="left" class="button-active" id="left" type="button"
value="left"></button>
    <button name="right" class="button-active" id="right" type="button"
value="right"></button>
    </div>
    <div class="divider-left">
    <div class="v-separator"></div>
    </div>
    <div class="pagenum">
```

```
    <input id="currentpage" type="text" size="3">
    <label id="totalpage"> / 3</label>
  </div>
  <div class="slider">
    <input id="inputrange" style="background: linear-gradient(to right, rgb(0, 123, 191) 50%, rgb(205, 205, 205) 50%);" type="range" min="1" max="3">
  </div>
  <div class="resizer" style="display: none;"></div>
</div>
...
```

The electronic document can include viewers as mentioned above, for rendering each file type contained within the electronic document, and one or more of the viewers can support scaling logic as discussed above.

FIGS. 8A-8E

FIGS. 8A-8E represent data structures which can be part of workspace data maintained by a database at the collaboration server at network node 111 in the form of a spatial event map as described in the co-pending U.S. patent applications which are incorporated by reference herein.

In FIG. 8A, an event data structure is illustrated. An event is an interaction with the workspace data that can result in a change in workspace data. Thus, an event can include an event identifier, a timestamp, a session identifier, an event type parameter, the client identifier, and an array of locations in the workspace, and can include one or more for the corresponding event. It is desirable for example that the timestamp have resolution on the order of milliseconds or even finer resolution, in order to minimize the possibility of race conditions for competing events affecting a single object. Also, the event data structure can include a UI target, which identifies an object in the workspace data to which a stroke on a touchscreen at a client display is linked. Events can include style events, which indicate the display parameters of a stroke for example. The events can include a text type event, which indicates entry, modification or movement in the workspace of a text object. The events can include a card type event, which indicates the creation, modification or movement in the workspace of a card type object. The events can include a stroke type event which identifies a location array for the stroke, and display parameters for the stroke, such as colors and line widths, for example.

Events can be classified as persistent, history events, and as ephemeral events. Processing of the events for addition to workspace data, and sharing among users can be dependent on the classification of the event. This classification can be inherent in the event type parameter, or an additional flag or field can be used in the event data structure to indicate the classification.

A spatial event map can include a log of events having entries for history events, where each entry comprises a structure such as illustrated in FIG. 8A. The server-side network node includes logic to receive messages carrying ephemeral and history events from client-side network nodes, and to send the ephemeral events to other client-side network nodes without adding corresponding entries in the log, and to send history events to the other client-side network nodes while adding corresponding entries to the log.

FIG. 8B illustrates a card data structure. The card data structure can provide a cache of attributes that identify current state information for an object in the workspace data, including a session identifier, a card type identifier, an array identifier, the client identifier, dimensions of the cards, type of file associated with the card, and a session location within the workspace.

FIG. 8C illustrates a data structure which consolidates a number of events and objects into a cacheable set called a chunk. The data structure includes a session ID, and identifier of the events included in the chunk, and a timestamp at which the chunk was created.

FIG. 8D illustrates the data structure for links to a user participating in a session in a chosen workspace. This data structure can include an access token, the client identifier for the session display client, the user identifier linked to the display client, a parameter indicating the last time that a user accessed a session, an expiration time and a cookie for carrying various information about the session. This information can for example maintain a current location within the workspace for a user, which can be used each time that a user logs in to determine the workspace data to display at a display client to which the login is associated.

FIG. 8E illustrates a display array data structure which can be used in association with large-format displays that are implemented by federated displays, each having a display client. The display clients in such federated displays cooperate to act as a single display. The workspace data can maintain the display array data structure which identifies the array of displays by an array ID, and identifies the session position of each display. Each session position can include an x-offset and a y-offset within the area of the federated displays, a session identifier, and a depth.

The system can encrypt communications with client side network nodes, and can encrypt the database in which the spatial event maps are stored. Also, on the client-side network nodes, cached copies of the spatial event map are encrypted in some embodiments, to prevent unauthorized access to the data by intruders who gain access to the client-side computers.

FIG. 9 is a diagram representing a functional architecture for a distributed collaboration system used to create, modify, distribute and display workspace data for a workspace. The basic configuration includes a collaboration service 901 which manages event data executed by a server, such as server 105, a portal service 902, which can be executed by a server such as server 105, or located in other computer systems accessible to the server, such as a peer network node, and a display client 903, located at a client-side network node, at which the user interaction is active. The display client 903 is in communication with the collaboration service 901 and with the portal 902. The communication channel 913 between the display client 903 and a collaboration service 901 manages the download of session history, and the live update of session events. Also, across this channel 913, a display client 903 can upload images that can be associated with events to the collaboration service 901. The display client 903 is in communication with the portal

902 across communication channel 923. The portal 902 to manages a homepage for the workspace data, session management and user administration. This portal can be utilized for user logins, authentications, and for delivering image files and the like as an alternative to, and in parallel with, the communication channel 913. The collaboration service 901 and portal 902 are in communication across channel 912. The collaboration service 901 and portal 902 manage authentication and authorization protocols, and coordinate session administration, and workspace data management.

The display client 903 can be part of a client-side network node including a physical or virtual computer system having computer programs stored in accessible memory that provide logic supporting the collaboration session, including an HTML 5 client, workspace data parsing searching and rendering logic, and a session events application to manage live interaction with workspace data at the server and the display wall. The display client 903 can include a publish function, which includes a graphical user interface rendered in association with the viewport in the workspace. Also, the display client can include support for an API message to the collaboration service 901, to cause the collaboration service to invoke a publish function at node 901. The GUI can include a pull down menu for example, that lists actions to be executed. One of the actions can be a publish command, which invokes an application to create an electronic document as described above.

The portal 902 can be part of a server-side network node including a physical or virtual computer system having computer programs stored in accessible memory, that provide logic supporting user access to the collaboration server. The logic can include applications to provide initial entry points for users, such as a webpage with login resources, logic to manage user accounts and session anticipation, logic that provides authorization services, such as OAuth-based services, and account data.

The collaboration service 901 can be part of a server-side network node and can manage the session event data, coordinate updated events among clients, deliver cacheable history and images to clients, and control access to a database stored in the workspace data.

FIGS. 10-11 are flowcharts illustrating logic executed by the server, the display clients, or both. The logic can be implemented using processors programmed using computer programs stored in memory accessible to the computer systems and executable by the processors, by dedicated logic hardware, including field programmable integrated circuits, and by combinations of dedicated logic hardware and computer programs. As with all flowcharts herein, it will be appreciated that many of the steps can be combined, performed in parallel or performed in a different sequence without affecting the functions achieved. In some cases, as the reader will appreciate, a rearrangement of steps will achieve the same results only if certain other changes are made as well. In other cases, as the reader will appreciate, a rearrangement of steps will achieve the same results only if certain conditions are satisfied. Furthermore, it will be appreciated that the flow charts herein show only steps that are pertinent to an understanding of the invention, and it will be understood that numerous additional steps for accomplishing other functions can be performed before, after and between those shown.

FIG. 10 illustrates basic logic executed on the server-side when a user joins a session as part of a persistent workspace. The flowchart begins with a login by the user (1010), in which the user may enter a user identifier in a web portal access through a device possessed by the user, such as a personal computer, a touchpad, a smart phone, etc. Next, a user authentication protocol is executed (1012), where a protocol, for example, can include requiring the user to enter a personal password, to verify that the user is in fact a person who has entered the user identifier. Next, the collaboration server, using for example the portal machine, can present links to workspaces in which the authenticated user is authorized to participate (1014). Next, the collaboration server can determine a selected display client, and a selected workspace for the user (1016). This determination can be made by an exchange of messages between the user possessed machine, and the portal using the communication channel on which the authentication protocol is executed. When the display client and workspace are identified, the collaboration server can enable the display client to download data for the selected workspace (1018). Also, the collaboration server can add the client to a live event channel for the selected workspace (1020).

FIG. 11 illustrates basic two-channel logic executed on the client-side when a user joins a workspace. The flowchart begins with a login by the user (1030) executed on a first channel, in which the user may enter a user identifier and transmit it to the web portal. Next, the user authentication protocol is executed (1032). The user then opens a page at the portal using the communication channel on which the authentication protocol is executed, which displays links for authorized workspaces (1034). Next, the user enters data identifying a selected workspace and display client to be used in the current session (1036) using the first channel. After the server enables the selected display client, the user activity can transfer to a channel between the display client and the server, which can then download the workspace data for the selected session (1038). The display client can then traverse the workspace data and construct an image for the display area managed by the display client (1040). Also, the display client can then join the live event channel (1042). The client-side network node and the server-side network node can establish a protocol for encryption and decryption of the spatial event map data during establishment of the session.

In one example, the process of downloading the workspace data includes delivering the event objects for the session to each display client. Included with the workspace data, a current user location can be provided. Alternatively, the workspace data can be delivered, followed by a sequence of messages which identify to the display client how to compute an offset from a default location, such as at the center of the workspace data, to a current location associated with the user. Each display client then can traverse the event objects to identify those objects having session locations which map to the display area managed by the display client. The logic to traverse the event objects can include an R-TREE search for example, which is configured to find objects in the workspace that map to the display area. The identified objects can then be rendered, possibly communicating with the portal to obtain data relevant to the objects, on the display area managed by the display.

Figure 12:
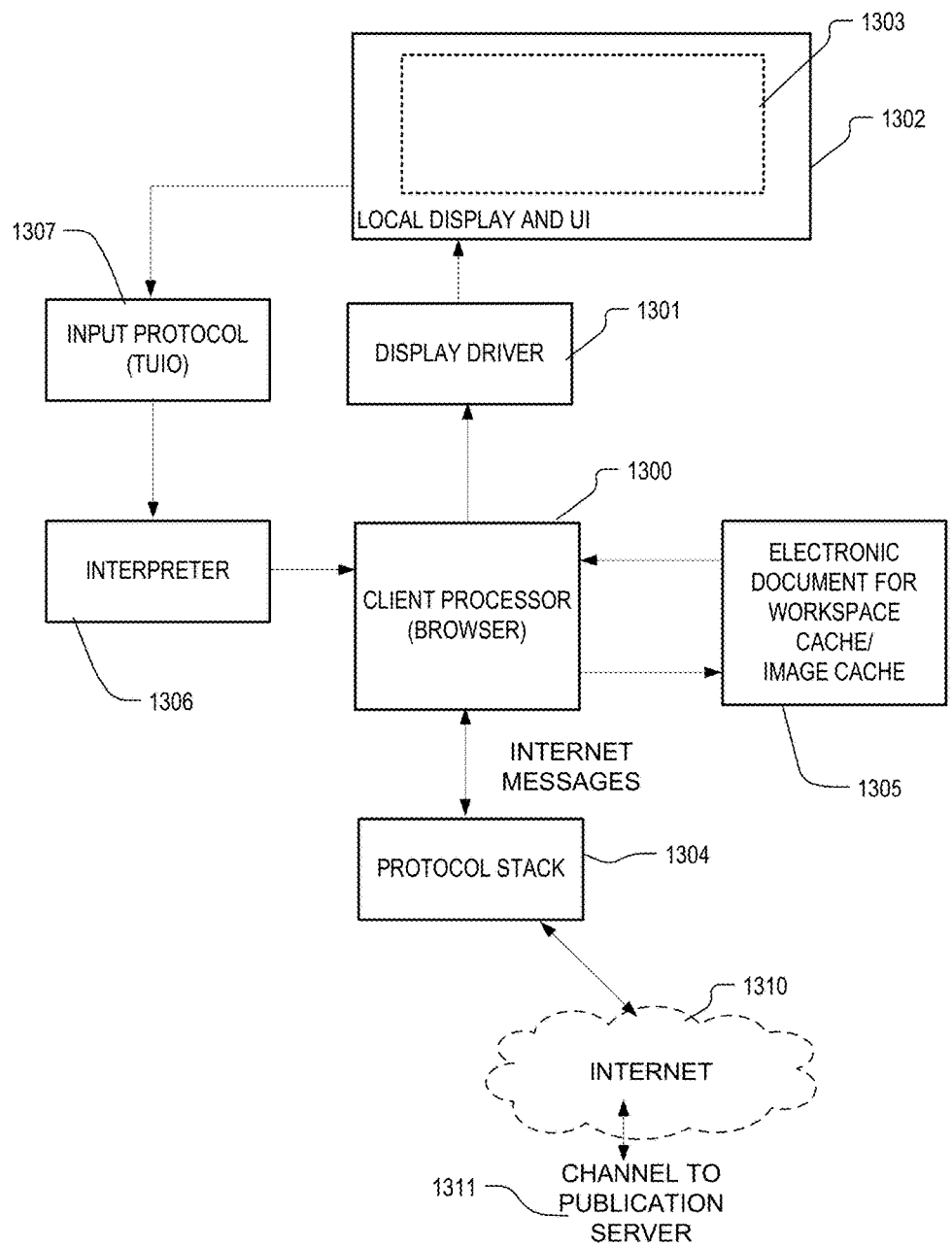
FIG. 12 is a simplified functional block diagram of a client-side network node and display.

FIG. 12 is a simplified diagram of a consuming workstation at network node 141, including a client processor 1300, a display driver 1301, a local display and user interface 1302, such as a touchscreen, a protocol stack 1304 including a communication interface controlled by the stack, local memory 1305 storing a cache copy of the electronic document for the workspace, such as described above, and input protocol device 1307 which executes an input protocol which translates input from a tangible user input device such as a touchscreen, or a mouse, into a form usable by a command interpreter 1306. A suitable input protocol device 1307 can include software compatible with a TUIO industry-standard, for example, for interpretation of tangible and multi-touch interaction with the display wall. The protocol stack 1304 receives Internet messages from the client processor 1300, and a link 1310 to the Internet in support of other communications that serve the local display and user interface 1302, including a channel 1311 to a publication server as discussed above. The display driver 1301 controls a displayable area 1303 on the local display and user interface 1302. The displayable area 1303 can be logically configured by the client processor or other programming resources in the client-side network node. Also, the physical size of the displayable area 1303 can be fixed for a given implementation of the local display. The client processor 1300 can include processing resources such as a browser, but does not need resources to process spatial event map API-compliant messages or the like.

The consuming workstation at network node 141 shown in FIG. 12 illustrates an example including an application interface including a process to communicate with the server-side network node.

Figure 13:
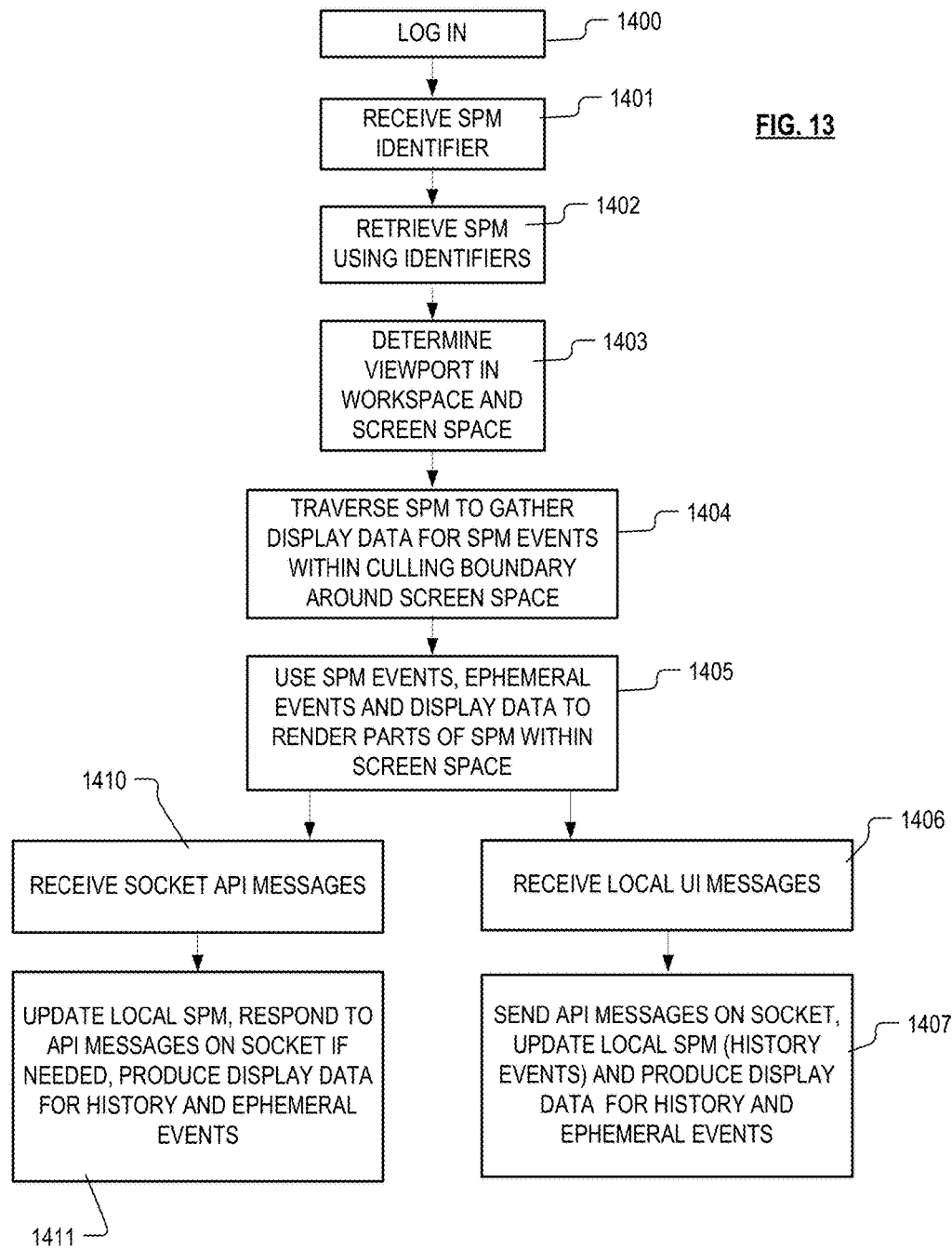
FIG. 13 is a flowchart illustrating operation of a client-side network node like that of FIG. 12.

FIG. 13 is a simplified flow diagram of a procedure executed by the client-side network node, such as the collaborator at network node 151 of FIG. 1. The order illustrated in the simplified flow diagram is provided for the purposes of illustration, and can be modified as suits a particular implementation. Many of the steps, for example, can be executed in parallel. In this procedure, a client login is executed (1400) by which the client is given access to a specific collaboration session and its spatial event map. The collaboration server provides an identifier of, or identifiers of parts of, the spatial event map which can be used by the client to retrieve the spatial event map from the collaboration server (1401). The client retrieves the spatial event map, or at least portions of it, from the collaboration server using the identifier or identifiers provided (1402).

For example, the client can request all history for a given workspace to which it has been granted access as follows:
curl http://localhost:4545/<sessionId>/history
The server will respond with all chunks (each its own section of time):

```
["/<sessionId>/history/<startTime>/<endTime>?b=1"]
["/<sessionId>/history/<startTime>/<endTime>?b=1"]
```

For each chunk, the client will request the events:

```
Curl http: //localhost:4545/<sessionId>/history/<startTime>/<endTime>?b=<cache-buster>
```

Each responded chunk is an array of events and is cacheable by the client:

```
[
    [
        4,
        "sx",
        "4.4",
        [537, 650, 536, 649, 536, 648, ...],
        {
            "size": 10,
            "color": [0, 0, 0, 1],
            "brush": 1
        },
```

```
        1347644106241,
        "cardFling"
    ]
]
```

The individual messages might include information like position on screen, color, width of stroke, time created etc.

The client then determines a viewport in the workspace using, for example, a server provided focus point, and display boundaries for the local display (1403). The local copy of the spatial event map is traversed to gather display data for spatial event map entries that map to the displayable area for the local display. In some embodiments, the client may gather additional data in support of rendering a display for spatial event map entries within a culling boundary defining a region larger than the displayable area for the local display, in order to prepare for supporting predicted user interactions such as zoom and pan within the workspace (1404). The client processor executes a process using spatial event map events, ephemeral events and display data to render parts of the spatial event map that fall within the display boundary (1405). This process receives local user interface messages, such as from the TUIO driver (1406). Also, this process receives socket API messages from the collaboration server (1410). In response to local user interface messages, the process can classify inputs as history events and ephemeral events, send API messages on the socket to the collaboration server for both history events and ephemeral events as specified by the API, update the cached portions of the spatial event map with history events, and produce display data for both history events and ephemeral events (1407). In response to the socket API messages, the process updates the cached portion of the spatial event map with history events identified by the server-side network node, responds to API messages on the socket as specified by the API, and produces display data for both history events and ephemeral events about which it is notified by the socket messages (1411).

Logging in and downloading spatial event map.
1. The client requests authorization to join a collaboration session, and opens a workspace.
2. The server authorizes the client to participate in the session, and begins loading the spatial event map for the workspace.
3. The client requests an identification, such as a "table of contents" of the spatial event map associated with the session.
4. Each portion of the spatial event map identified in the table of contents is requested by the client. These portions of the spatial event mapped together represent the workspace as a linear sequence of events from the beginning of workspace-time to the present. The "beginning of workspace-time" can be considered an elapsed time from the time of initiation of the collaboration session, or an absolute time recorded in association with the session.
5. The client assembles a cached copy of the spatial event map in its local memory.
6. The client displays an appropriate region of the workspace using its spatial event map to determine what is relevant given the current displayable area or viewport on the local display.

Connecting to the session channel of live spatial event map events:

1. After authorization, a client requests to join a workspace channel.
2. The server adds the client to the list of workspace participants to receive updates via the workspace channels.
3. The client receives live messages from the workspace that carry both history events and ephemeral events, and a communication paradigm like a chat room. For example, a sequence of ephemeral events, and a history event can be associated with moving object in the spatial event map to a new location in the spatial event map.
4. The client reacts to live messages from the server-side network node by altering its local copy of the spatial event map and re-rendering its local display.
5. Live messages consist of "history" events which are to be persisted as undo-able, recorded events in the spatial event map, and "ephemeral" events which are pieces of information that do not become part of the history of the session.
6. When a client creates, modifies, moves or deletes an object by interaction with its local display, a new event is created by the client-side network node and sent across the workspace channel to the server-side network node. The server-side network node saves history events in the spatial event map for the session, and distributes both history events and ephemeral events to all active clients in the session.
7. When exiting the session, the client disconnects from the workspace channel.

A collaboration system can have many, distributed digital displays which are used both to display images based on workspace data managed by a shared collaboration server, and to accept user input that can contribute to the workspace data, while enabling each display to rapidly construct an image to display based on session history, real time local input and real-time input from other displays.

Figure 14:
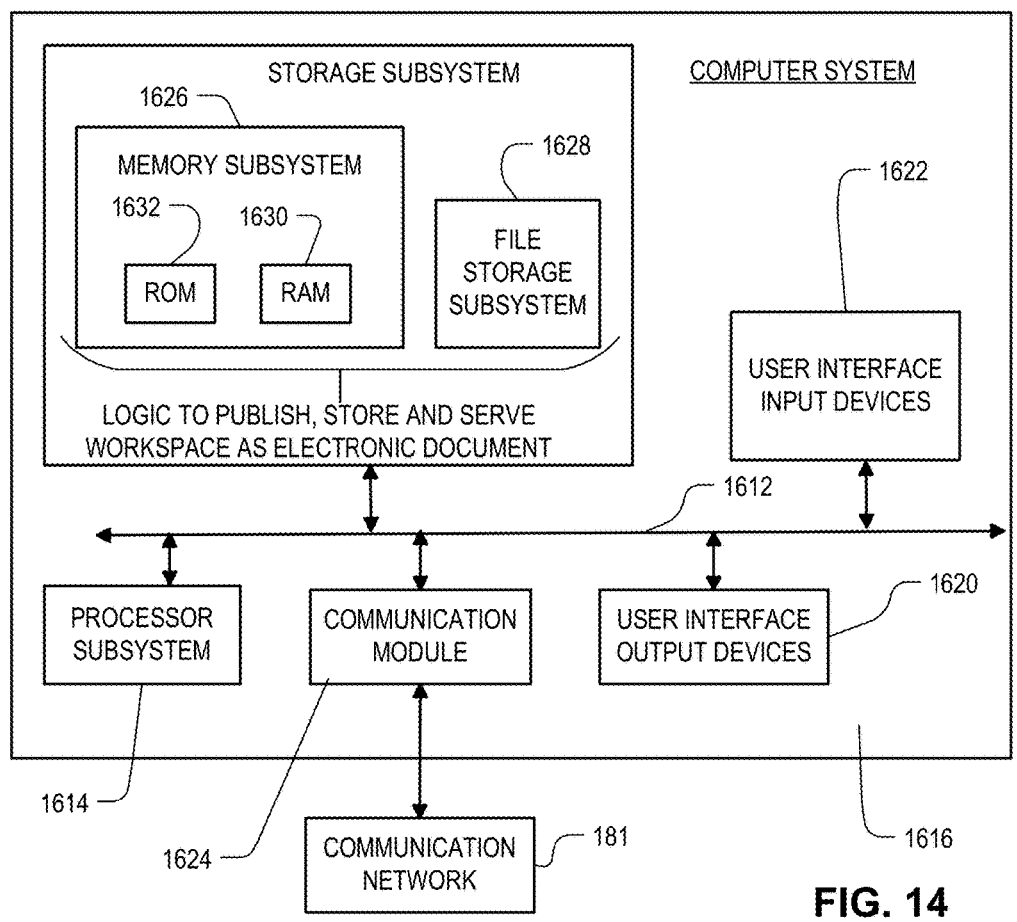
FIG. 14 is a simplified block diagram of computer system including logic as described herein.

FIG. 14 is a simplified block diagram of a computer system, or network node, which can be used to implement the client-side functions (e.g. computer system 110) or the server-side functions (e.g. server 105) in a distributed collaboration system. A computer system typically includes a processor subsystem 1614 which communicates with a number of peripheral devices via bus subsystem 1612. These peripheral devices may include a storage subsystem 1624, comprising a memory subsystem 1626 and a file storage subsystem 1628, user interface input devices 1622, user interface output devices 1620, and a network interface subsystem including communication module 1616. The input and output devices allow user interaction with the computer system. Communication module 1616 provides physical and communication protocol support for interfaces to outside networks, including an interface to communication network 181, and is coupled via communication network 181 to corresponding communication modules in other computer systems. Communication network 181 may comprise many interconnected computer systems and communication links. These communication links may be wireline links, optical links, wireless links, or any other mechanisms for communication of information, but typically it is an IP-based communication network, at least at its extremities. While in one embodiment, communication network 181 is the Internet, in other embodiments, communication network 181 may be any suitable computer network.

The physical hardware components of network interfaces are sometimes referred to as network interface cards (NICs), although they need not be in the form of cards: for instance they could be in the form of integrated circuits (ICs) and connectors fitted directly onto a motherboard, or in the form of macrocells fabricated on a single integrated circuit chip with other components of the computer system.

User interface input devices 1622 may include a keyboard, pointing devices such as a mouse, trackball, touchpad, or graphics tablet, a scanner, a touch screen incorporated into the display (including the touch sensitive portions of large format digital display 102c), audio input devices such as voice recognition systems, microphones, and other types of tangible input devices. In general, use of the term "input device" is intended to include all possible types of devices and ways to input information into the computer system or onto communication network 181.

User interface output devices 1620 may include a display subsystem, a printer, a fax machine, or non-visual displays such as audio output devices. The display subsystem may include a cathode ray tube (CRT), a flat panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from the computer system to the user or to another machine or computer system.

Storage subsystem 1624 stores the basic programming and data constructs that provide the functionality of certain embodiments of the present invention.

The storage subsystem 1624, when used for implementation of server side network-nodes, comprises a product including a non-transitory computer readable medium storing a machine readable data structure including a spatial event map which locates events in a workspace, wherein the spatial event map includes a log of events, entries in the log having a location of a graphical target of the event in the workspace and a time. Also, the storage subsystem 1624 comprises a product including executable instructions for performing the procedures described herein associated with the server-side network node. Also, the storage subsystem can include memory storing instructions that implement or support implementation of the publish function described herein.

The storage subsystem 1624, when used for implementation of client side network-nodes, comprises a product including a non-transitory computer readable medium storing a machine readable data structure including a spatial event map in the form of a cached copy as explained below, which locates events in a workspace, wherein the spatial event map includes a log of events, entries in the log having a location of a graphical target of the event in the workspace, and a time. Also, the storage subsystem 1624 comprises a product including executable instructions for performing the procedures described herein associated with a network node, including one or more of instruction modules for sending a message to another network node to invoke a publish function, for the publish function to be executed locally, and for storing and serving the published electronic document.

For example, the various modules implementing the functionality of certain embodiments of the invention may be stored in storage subsystem 1624. These software modules are generally executed by processor subsystem 1614.

Memory subsystem 1626 typically includes a number of memories including a main random access memory (RAM) 1630 for storage of instructions and data during program execution and a read only memory (ROM) 1632 in which fixed instructions are stored. File storage subsystem 1628 provides persistent storage for program and data files, and may include a hard disk drive, a floppy disk drive along with associated removable media, a CD ROM drive, an optical drive, or removable media cartridges. The databases and modules implementing the functionality of certain embodiments of the invention may have been provided on a computer readable medium such as one or more CD-ROMs, and may be stored by file storage subsystem 1628. The host memory subsystem 1626 contains, among other things, computer instructions which, when executed by the processor subsystem 1614, cause the computer system to operate or perform functions as described herein. As used herein, processes and software that are said to run in or on "the host" or "the computer," execute on the processor subsystem 1614 in response to computer instructions and data in the host memory subsystem 1626 including any other local or remote storage for such instructions and data.

Bus subsystem 1612 provides a mechanism for letting the various components and subsystems of a computer system communicate with each other as intended. Although bus subsystem 1612 is shown schematically as a single bus, alternative embodiments of the bus subsystem may use multiple busses.

The computer system itself can be of varying types including a personal computer, a portable computer, a workstation, a computer terminal, a network computer, a television, a mainframe, a server farm, or any other data processing system or user device. In one embodiment, a computer system includes several computer systems, each controlling one of the tiles that make up a large format display. Due to the ever-changing nature of computers and networks, the description of computer system depicted in FIG. 14 is intended only as a specific example for purposes of illustrating the preferred embodiments of the present invention. Many other configurations of the computer system are possible having more or less components than the computer system depicted in FIG. 14. The same components and variations can also make up other devices in the collaboration environment of FIG. 1.

Certain information about the drawing regions active on the digital display 102c are stored in a database accessible to the computer system 110 of the display client. The database can take on many forms in different embodiments, including but not limited to a MongoDB database, an XML database, a relational database, or an object-oriented database.

A spatial event map system can include an API executed in coordination by client-side and server-side resources including any number of physical and virtual machines, and produce a data structure for a workspace based on a log of events which can be used in embodiments of the publish function in the electronic document described herein. One example of an API is described below. An API can be defined in a variety of ways, while including the elements supporting maintenance of a spatial event map in a server-side network node or nodes, and supporting sharing of the spatial event map with one or a plurality of active client-side network nodes. In this example, the API is broken down into processes managed by two servers:

Socket Requests Server (Websockets)—used for updating clients with relevant data (new strokes, cards, clients, etc.) once connected. Also handles the initial connection handshake.

Service Requests Server (HTTP/REST)—used for cacheable responses, as well as posting data (i.e. images and cards)

Client-side network nodes are configured according to the API, and include corresponding socket requests clients and service requests clients.

Socket Requests:

The socket server can execute a network protocol that maintains connections via Websockets. The messages used in the API can be encapsulated within the Websocket protocol. Messages can be individual UTF-8-encoded JSON arrays.

Initial loading of history, including all or part of a spatial event map of a collaboration session, at the client-side network nodes can be done using HTTP requests via the Service Requests Server, rather than websockets to support caching.

Socket Connection

```
http://localhost:4545/<sessionId>/socket?device=<device>
    sessionId -- (string) the id of the session to join
    device -- (string) a device type, such as a wall or a desktop.
```

Message Structure

The first element of each message array is a sender-id, specifying the client that originated the message. Sender-ids are unique among all sessions on the server. The id and cr messages sent from the server to the client have their sender-id set to a default value, such as −1. The second element of each message array is a two-character code. This code defines the remaining arguments in the array as well as the intended action. Messages sent with a sender-id of −1 are messages that originate from the server.

Valid Message Types

The following are messages supported by the API example herein. Many of these messages take the following parameter:

sender-id:—the ID of the client sending the message, or −1 if the message originates with the server.

Client ID Request:

// server<--client ["id", sessionId, zoomLevel, x1, y1, x2, y2]

This request can be used to enable interaction with the socket API.

This request starts the asynchronous client-id request/response handshake. The next section explains the asynchronous acknowledgment of the new client (including the provided client ID).

SessionId—(string) the id of the workspace to join.

zoomLevel—(int) the zoom level desired by this client x1, y1—(int, optional) the desired point of origin for the users viewport x2, y2—(int, optional) the desired point of extent for the users viewport There is no sender-id sent with this message.

The zoom level sent in this message is the zoom level preferred by this client. If the client joins an empty display array (via the "id" message), the client's preferred zoom level becomes the initial zoom level for the display array. If the client joins an existing display array, the preferred zoom level sent in its "id" message is ignored, and the zoom level associated with the existing display array is sent (in the "av" message).

Client ID Response:

// server-->client [−1, "id", client-id]

Clients are required to store the assigned client ID for use in subsequent socket requests. Informs a new client of their ID. In this case, sender-id is set to −1 client-id—(string) the ID of the newly-joined client

Join Room:

```
// server <-- client [sender-id, "jr", room-id, [data]] [sender-id, "jr",
"lobby"][sender]
```

Informs the server of an attempt by the client to join a room.
  room-id—can contain one of lobby or session.
  data—is a wildcard set of arguments, which should be used to initialize the room.
Room Data Arguments:
  Session requires "session-id" containing the id of the session. Array requires:
    arrayId—(string) id of the display array
    x—(integer) x offset of this display
    y—(integer) y offset of this display
    width—(integer) width of this display
    height—(integer) height of this display
Server will respond with a "room" message in response.
  Room Join Response:
// server-->client [-1, "room", [room-id], [databag]] [-1, "room", "lobby", {pin: pin}]
  room-id—contains one of: lobby or session
  databag—is a room-specific bag of variables:
  lobby provides:
    pin—containing the pin for wall authentication
Session Provides:
    sessionName—containing the name of the session
  Room List Response
// server-->client [-1, "rl", roomMembershipList]

Informs the client of the room memberships. Room memberships include information regarding clients visiting the same room as you.
    roomMembershipList—(array of room membership objects)
  Session Request:
    // server<--client [sender-id, "sr"]
Informs the server that the client would like the list of joinable active sessions.
  Session List:
    // server-->client [-1, "sl", sessionList]
Informs the client of the joinable active sessions.
  SessionList—(array of strings)
  Object ID Reservation:
Use this to create a new unique object id that is acceptable for creating new history events which create an object.
    // server<->client [sender-id, "oid"]
Server Responds with:
    [-1, 'oid', <new-object-id>]
History Event
  All persistent events are sent as HistoryEvent. This includes:  moving windows  setting text  deleting windows  creating windows.
  HistoryEvents are written to the session's history and returned when the history is retrieved.
  HistoryEvents are sent to the server without an eventId. The server assigns an eventId and broadcasts the event to all clients (including the originating client).
  New object ids can be reserved using the oid message.
  Basic Message Format

```
// server <-- client [client-id, "he", target-id, event-type, event-properties]
client-id - - (string) the ID of the originating client
target-id - - (string) the ID of the target object/widget/app to which this event is relevant
event-type - - (string) an arbitrary event type
```

-continued

```
properties - - (object) a JSON object describing pertinent key / values for the event.
// server --> client[client-id, "he", target-id, event-id, event-type, event-properties]
client-id - - (string) the ID of the originating client
target-id - - (string) the ID of the target window to which this event is relevant
event-id - - (string) the ID of the event in the database
event-type - - (string) an arbitrary event type
properties - - (object) a JSON object describing pertinent key / values for the event.
```

Example Interaction: Moving Objects

A good example illustrating some of the persistent event/ephemeral event classification is moving an object. While the object is being moved or for example resized by dragging, a series of ephemeral events (termed "volatile events VEs") is sent to the server, and re-broadcast to all clients in the session. Once the user finishes moving the object, the client should send a history event to specify the rect and order of the object:

```
["511d6d429b4aee0000000003","he","511d6f9c9b4aee0000000039","position",{ "rect" }...
```

The server will respond with the newly persisted HE record. Note the inclusion of the record's eventId.
// server->client format of 'he' is: [<clientId>, <messageType>, <targetId>, <eventId>,
Note: The eventId will also be included in history that is fetched via the HTTP API.
  History events by Object/Application type
Session
  Create—Add a note or image on the work session
  stroke—Add a pen or eraser stroke on the background
Note
  text—Sets or update the text and/or text formatting of a note.
  delete—Remove the note from the work session
  position—Update the size or location of the note in the work session
  pin—Pin or unpin the note
  stroke—Add a pen or eraser stroke on top of the image
Image
  delete—Remove the note from the work session
  position—Update the size or location of the note in the work session
  pin—Pin or unpin the note
  stroke—Add a pen or eraser stroke on top of the image
History Event Details
  text
sets and styles the text of a note. Both the text attribute and style attribute are optional.
// server<--client[client-id, "he", target-id, "text", {"text": "abcdef",
  create
sent to clients when the server receives a card create (cc) message or an image upload.
For create messages the target-id is the session-id.

```
// server <-- client[client-id, "he", session-id, event-id "create", { "id":"5123e7ebcd18d3ef5e000001"
```

Properties
  id—(int) unique identifier for the window
  baseName—(string) the background image file name
  ext—(string) the background image file extension
  rect—(object) the location of the window
  actualWidth—(int) the background image width
  actualHeight—(int) the background image height
  order—(int) z order
  type—(string) "note" for objects that can have text, "image" for other objects
  regionId—(string) the canvas region if the object is created in a canvas region
  hidden—(boolean) whether the window is currently hidden
  delete
used to make a window disappear from the session. Delete is an undo-able action.
// server<--client[client-id, "he", target-id, "delete", {"hidden":true}]// server-->
  Position
used to save the position of a window after a move, fling, or resize
// server<--client[client-id, "he", target-id, "position", {"rect":[−1298,−390,−1018
  Properties
  rect—(object) the location of the target window
  order—(int) the z-order of the target window
  stroke
used to save a stroke
/ server<--client[client-id, "he", target-id, "stroke", {"size": 10, "brush":
  Properties
  locs—(array) stroke locations in the format: [10, 1, 10, 2, 12, 3] where coordinates are paired [x, y, x, y, x, y] in an array
  pin
sent to clients to pin a note or image in place or to remove an existing pin. Windows that are pinned cannot be moved or resized until they are unpinned.
// server-->client[client-id, "he", session-id, event-id, "pin", {"pin": true}]
  Properties
  pin—(boolean) true is pin, false is un-pin
Volatile Event
  Volatile events are ephemeral events not recorded in the undo/playback event stream, so they are good for in-progress streaming events like dragging a card around the screen, and once the user lifts their finger, a HistoryEvent is used to record its final place.
// server<-->client[client-id, "ye", target-id, event-type, event-properties]
  client-id—(string) the ID of the originating client
  target-id—(string) the ID of the target window to which this event is relevant
  event-type—(string) an arbitrary event type
  properties—(object) a JSON object describing pertinent key/values for the
event.
  Volatile Events by Object/Application Type
Session
  sb—Starts a stroke. Used to render strokes on one client while they are being drawn on another client.
  sc—Continues a previously started stroke by giving another point to include. Used to render strokes while they are being drawn on another client.
  se—Ends a previously started stroke.

Note
  fling—Animates a note sliding from one place in the work session to another.
This is the visual response to a flick or fling action by the user.
  position—Live updates the position of a note while its being moved by another user.
  sb—Starts a stroke. Used to render strokes on one client while they are being drawn on another client.
  sc—Continues a previously started stroke by giving another point to include. Used to render strokes while they are being drawn on another client.
  se—Ends a previously started stroke.
Image
  fling—Animates an image sliding from one place in the work session to another. This is the visual response to a flick or fling action by the user.
  position—Live updates the position of an image while its being moved by another user.
  sb—Starts a stroke. Used to render strokes on one client while they are being drawn on another client.
  sc—Continues a previously started stroke by giving another point to include. Used to render strokes while they are being drawn on another client.
  se—Ends a previously started stroke.
Types of Volatile Events
  Fling
used to broadcast a fling action to all connected clients.
// server<-->client[client-id, "ye", target-id, "fling", {"velocityX": 10, "velocityY"
  Properties
  velocityX (int) the x component of the fling vector
  velocityY (int) the y component of the fling vector
  position—ye
used to broadcast intermediate steps of a window move
// server<-->client[client-id, "ye", target-id, "position", {"rect":[−1298,−390,−1018
  Properties
  rect (object) the location of the target window
  order (int) the z-order of the target window
  sb:
used to broadcast the beginning of a stroke
// server<-->client[client-id, "ye", target-id, "sb",{"brush": 1, "size":2, "color"
  Properties
  x,y—(int) the starting point of this stroke
  strokeId—(string) the ID of the new stroke
  sc:
// server<-->client[client-id, "ye", target-id, "sc", {"x":100, "y":300, "strokeId"
used to broadcast a continuation of a stroke
  Properties
  x,y—(int) the new end-point of the stroke
  strokeId—(string) the ID of the new stroke
  se:

// server <--> client[client-id, "ve", target-id, "se", "strokeId" : "395523d316e942b496a2c8a6fe5f2cac"

End the stroke specified by stroke-id
  stroke-id—(string) the ID of the continued stroke
  Delete Stroke:
// server-->client[sender-id, "sd", stroke-id, target-id]
Delete a Stroke.
  stroke-id—(string) the ID of stroke
  target-id—(string) the ID of the stroke target Undo:
Undoes the last undo-able action (move, set text, stroke, etc).

```
// server <-- client
[sender-id, "un"]// server --> client
[client-id 'undo', target-
```

Undo Example: Move a window and then undo that move The following example shows a move, and how that move is undone. //Client sends move and then an undo message.

The server removes the history event of the move from the session history and notifies the client that this record will no longer be a part of the session's spatial event map, taking it out of the history timeline. Future requests of the history via the HTTP API will not include the undone event (until after a redo).

Display Array Dimensions:
// server-->client [-1, "dd", arrayId, width, height]
Informs clients of changes to the overall display array width and height. This may not be utilized with the client-side network node has resources to manage the local display of portions of the spatial event map.
  arrayID—(string) the ID of the display array
  width, height—(integers) width and height of the display array in pixels Pan array:
//client-->server [sender-id, "pa", newArrayOffsetX, newArrayOffsetY] Inform the server of a pan to a new location.
  newArrayOffsetX, newArrayOffsetY—(int) the new location of the display array after panned.

Session Change:
// server-->client [sender-id, "cs", sessionId]
Inform siblings in a display array that the session has changed.
  SessionId—(string) is the id of the session to switch to Zoom Change:
//client-->server [sender-id, "zc", zoomLevel, zoomCenterX, zoomCenterY]
Inform the server that a zoom was requested.
  zoomLevel (integer) the zoom level to transition to, from 1 to 11
  zoomCenterX (integer) the x coordinate of the origin of the zoom
  zoomCenterY (integer) the y coordinate of the origin of the zoom Map-Mode Change:

```
// client --> server
[sender-id, "mm", zoomLevel, zoomCenterX, zoomCenterY]
```

Inform the server that map-mode was requested. Superficially, this operates near identically to the zoomchange message, except where dozens or hundreds of zoom-change messages are meant to be sent rapid-fire with tweening between them in the graphical treatment, the map-mode message is intended for a single zoom snap with different transition effects.
zoomLevel—(integer) the zoom level to transition to, from 1 to 11
  zoomCenterX—(integer) the x coordinate of the origin of the zoom
  zoomCenterY—(integer) the y coordinate of the origin of the zoom Create Card

```
// server <-- client
[sender-id, "cc", templateId, regionId, x, y, x2, y2]
``` templateId—(string) the id of the card template to be used
  regionId—(string) the canvas region id of the originating event (if any)
  x, y, x2, y2—(int) the desired rect for the new card User Permissions
// server-->client [sender-id, "up", permissions]
  permissions a hash of permission types and true/false to indicate if the authenticated user has that permission. Currently the only permission is "can_share" indicating users who can share the session with others.

Save Position:
// client-->server [-1, "sp", zoomLevel, x, y]
Saves the current screen position. On reconnect, the client will receive a 'zc' (zoom-change) and 'pa' (pan-array) message sending them back to this location.
  zoomLevel (integer) the zoom level the device is currently on
  x (integer) the x coordinate of the origin of the screen
  y (integer) the y coordinate of the origin of the screen Stroke IDs
Stroke ID's are selected by the client. Currently they are the sender-id composed with an increasing integer, separated by a dot. This is to make it unique within the server context among all clients.

Target IDs
A stroke may be attached to a specific target in the session, like a sub-canvas (called a "card") that floats above the main canvas. In the case of a stroke belonging to a card, the target ID field would contain the card ID. Strokes destined for the main canvas in the session are designated by having their target ID be the same as the session name.

Establishing Connections
When a client establishes a new websocket connection with the server, the server first chooses a unique client ID and sends it in an "id" message to the client. It then sends the "pa" message with senderid set to −1.

The representative flow then is for the client to perform an HTTP GET "/:sessionId/objects" (documented below) to receive information about the cards in the session. Then the client requests "/:sessionId/history" (also documented below), which receives an array of history urls. These are broken into batches to improve cacheablity. The client then GETs each url not stored in the local cache, and the server will respond with the stroke data for those history batches.

Service Requests
History:
Gets a list of history bookmarks. Each bookmark is a span of cached stroke history.
  curl http://localhost:4545/<sessionId>/history
  sessionId
  name of the session you're getting the history for
Response Headers
HTTP/1.1 200 OKX-Powered-By: ExpressAccess-Control-Allow-Origin: *Access-Control-Allow-Headers:
Response

```
["/<sessionId>/history/<startTime>/<endTime>?b=1"]
["/<sessionId>/history/<startTime>/<endTime>?
``` sessionId—(string) id of the session to switch to
  startTime—(integer) beginning timestamp
  endTime—(integer) ending timestamp
  b—cache buster Retrieving a Block of History:
Gets the history between start time and end time. A request needs to be made for each returned span of history.
curl http: //localhost:4545/<sessionId>/history/<startTime>/<endTime>?b=<cache-buster>
    sessionId—id of the session you're getting the history for
    startTime—the start time as given by initial history request
    endTime—the end time as given my initial history request
    cacheBuster—a simple key that will be changed whenever client-stored cache is no longer valid
Response Header
    HTTP/1.1 200 OKX-Powered-By: ExpressAccess-Control-Allow-Origin: *Access-Control-Allow-Headers: X-Requested-With Content-Type: application/json
    Content-Length: 2134
    ETag: 1346968307576
    Date: Fri, 14 Sep. 2012 17:35:14 GMT
    Connection: keep-alive
Response

```
[
    [
        4,
        "sx",
        "4.4",
        [537, 650, 536, 649, 536, 648, ...],
        {
            "size": 10,
            "color": [0, 0, 0, 1],
            "brush": 1
        },
        1347644106241,
        "cardFling"
    ]
]
```

(see documentation for sx "stroke-complete" websocket message)
Retrieving Objects:
Gets the objects (cards/images) for the requested session.
curl http://localhost:4545/<sessionId>/objects
sessionId id of the session you're getting the history for
Response Header
HTTP/1.1 200 OK
X-Powered-By: Express
Access-Control-Allow-Origin: *
Access-Control-Allow-Headers: X-Requested-With
Content-Type: application/json; charset=utf-8
Content-Length: 285
Date: Fri, 14 Sep. 2012 17:35:14 GMT
Connection: keep-alive
Response

```
[
    {
        "eventType": "oc",
        "id": "50536840ce64b39439000005",
        "baseName": "sessions/all/green",
        "ext": "JPEG",
        "rect": [-239, 49, 361, 649],
        "arrayId": 3,
        "clientId": 3,
        "regionId": null,
        "sessionId": "cardFling",
        "actualWidth": 600,
        "actualHeight": 600,
        "order": null,
        "_id": "50536840ce64b39439000005",
        "type": "image"
    },
    {
        "eventType": "oc",
        "id": "50536b66ce64b39439000006",
        "baseName": "sessions/all/orange",
        "ext": "JPEG",
        "rect": [-97, 190, 503, 790],
        "arrayId": 5,
        "clientId": 5,
        "regionId": null,
        "sessionId": "cardFling",
        "actualWidth": 600,
        "actualHeight": 600,
        "order": null,
        "_id": "50536b66ce64b39439000006",
        "type": "image"
    }
]
```

Card Templates:
Gets a list of global card templates for creating cached, re-usable cards. This is different from uploading a file as the same background-image is used for all cards created with this template.
curl http://localhost:4545/card templates.json
Response

```
[
    {
        "id":"50901cb0b9a18c190902a938",
        "width":600,
        "thumbnail":"card_templates/thumbnails/pink.jpeg"
    },
    {
        "id":"50901cb0b9a18c190902a939",
        "width":600,
        "thumbnail":"card_templates/thumbnails/green.jpeg"
    }
]
```

These values can be used to send a create card message:

```
// creates a new card using the pink template above
["cc", "50901cb0b9a18c190902a938", <regionIdOrNull>, <x>, <y>]
```

Upload:
    Sends an image to the server to be placed in the session.
    curl -F "file=@photo.JPG"-F "x=236"-F "y=832"-F "clientId=10"-F
    "sessionId=cardFling"
    -F "arrayId=10"-F "order=23"-F "x2=899"-F "y2=1495"-F
    "filename=photo.jpg"
    http://localhost:4545/<sessionId>/object/upload
Params
x: x position of drop
y: y position of drop
clientId: client Id
sessionId: session Id
arrayId: array identifier
order: z order
x2: x position of bottom right corner of drop
y2: y position of bottom right corner of drop
filename: name of file uploaded
    The API described above provides one example message structure. Other structures may be utilized as well, as suits a particular implementation.

To create the electronic document, a publish function can take a workspace ID, retrieve the spatial event map for the identified workspace, and reproduce the spatial event map. The reproduced version can be formed by exporting the spatial event map from a form used in the collaboration system (native form, used by processes inside the collaboration system) such as objects in a key-value store used within the collaboration store, like a Mongo database file, to a form used in the electronic document (external form, external to the collaboration system) by platforms outside the collaboration system, such as objects expressed as attribute-value pairs in a JSON object format. In some embodiments, the native form and the external form can be the same. In other embodiments, the native form can consist of a unique log file, a file compatible with data storage formats other than Mongo, or other unique or common file structures including JSON for example. Likewise, in other embodiments, the external form can consist of file structures other than JSON files, including unique file structures or other commonly used file structures, such as XML files and Mongo files. For example, the spatial event map can be implemented as a log of events in a Mongo database file, for use in the collaboration system. It can be exported to a JSON file, an example of which is provided below, for use in the electronic document.

The reproduced version maintains the virtual space characteristics of the workspace represented by the spatial event map, so that the locations of the events in the virtual space are maintained.

The assets (e.g. graphical targets) of the events in the spatial event map are duplicated in a store (like a cache) inside the electronic document, or otherwise in a form outside the collaboration system accessible by the platform using the electronic document. The links to the assets in the reproduced version of the spatial event map point to the duplicated versions of the assets, thereby isolating the electronic document from the workspace within the collaboration system, and supporting fast rendering of the content at the external platform. Links in the native spatial event map may be addresses to a folder in a database as described below. Links in the exported version of the spatial event map may be copied, and the assets stored in the electronic document using the same folder format. In this manner, the link does not need to be modified while the viewer is able to access the duplicated version using the same link text. Alternatively, new links can be computed for the duplicated assets, and changed file structures can be used.

For assets that include links to remote objects, which are not stored in the collaboration system, such as a video hosted in the Internet, the electronic document can store the link to the remote asset in the reproduced version of the spatial event map, or in the asset file.

A control program is associated with, or part of, the electronic document, and provided with the electronic document for the purposes of enabling the platforms to render assets within viewports of the virtual space specified in the electronic document on their native screens.

Upon creation of the electronic document, it can be stored in a memory accessible to the platforms outside the collaboration system, such as a cloud based store (e.g. Amazon Web Services S3 storage), and assigned a unique URL. The URL can be sent to or retrieved by external platforms, and the electronic document downloaded to the platform for rendering. Alternatively, or in addition, the electronic document can be encapsulated in a file, such as by compression or encryption, and sent to platforms in the encapsulated form.

The control program is an executable program which can process the reproduced version of the spatial event map. The platform executing the electronic document defines a viewport based on a starting location in the virtual space and the pixel resolution and dimensions of the screen space allocated for displaying the electronic document. The control program supports operations such as pan and zoom within the virtual space by which the viewport is moved and changed in size.

In rendering the electronic document, events having locations within the viewport at a specific time are identified, the graphical targets of the events are read from the cache of the electronic document assets, and then rendered in the screen space. The specific time can be the time the electronic document was created. It can also be set in some embodiments to any time going back from the time of creation to the time the spatial event map was started in the collaboration system.

The initial position in the workspace of the viewport to be rendered on the screen space of the viewing platform can be the location of the viewport on a client in the collaboration system at the time a "publish" command is executed. This location may be identified by an event that is part of the spatial event map.

The workspace published in this manner can include location markers. The viewer can render a graphical user interface in association with the content of the electronic document, which implements specific tools. One tool can include a list of location markers in the electronic document workspace, with support for selection of location markers in the list. For example, a "pull down menu" can be executed. Upon selection of a location marker, the viewer creates a new viewport to the location specified, and renders the graphical targets of the events from that new viewport.

A checksum can be computed and linked to the electronic document, and used to verify that it has not been altered. A server can include logic to verify the checksum of submitted electronic documents, and indicate authenticity and lack of alteration. Other security and digital rights management tools can be implemented with the electronic document.

As used herein, the "identification" of an item of information does not necessarily require the direct specification of that item of information. Information can be "identified" in a field by simply referring to the actual information through one or more layers of indirection, or by identifying one or more items of different information which are together sufficient to determine the actual item of information. In addition, the term "indicate" is used herein to mean the same as "identify".

Also as used herein, a given signal, event or value is "responsive" to a predecessor signal, event or value if the predecessor signal, event or value influenced the given signal, event or value. If there is an intervening processing element, step or time period, the given signal, event or value can still be "responsive" to the predecessor signal, event or value. If the intervening processing element or step combines more than one signal, event or value, the signal output of the processing element or step is considered "responsive" to each of the signal, event or value inputs. If the given signal, event or value is the same as the predecessor signal, event or value, this is merely a degenerate case in which the given signal, event or value is still considered to be "responsive" to the predecessor signal, event or value. "Dependency" of a given signal, event or value upon another signal, event or value is defined similarly.

The applicant hereby discloses in isolation each individual feature described herein and any combination of two or more such features, to the extent that such features or combinations are capable of being carried out based on the present specification as a whole in light of the common general knowledge of a person skilled in the art, irrespective of whether such features or combinations of features solve any problems disclosed herein, and without limitation to the scope of the claims. The applicant indicates that aspects of the present invention may consist of any such feature or combination of features. In view of the foregoing description it will be evident to a person skilled in the art that various modifications may be made within the scope of the invention.

The foregoing description of preferred embodiments of the present invention has been provided for the purposes of illustration and description. It is not intended to be exhaustive or to limit the invention to the precise forms disclosed. Obviously, many modifications and variations will be apparent to practitioners skilled in this art. For example, though the displays described herein are of large format, small format displays can also be arranged to use multiple drawing regions, though multiple drawing regions are more useful for displays that are at least as large as 12 feet in width. In particular, and without limitation, any and all variations described, suggested by the Background section of this patent application or by the material incorporated by reference are specifically incorporated by reference into the description herein of embodiments of the invention. In addition, any and all variations described, suggested or incorporated by reference herein with respect to any one embodiment are also to be considered taught with respect to all other embodiments. The embodiments described herein were chosen and described in order to best explain the principles of the invention and its practical application, thereby enabling others skilled in the art to understand the invention for various embodiments and with various modifications as are suited to the particular use contemplated.

The technology disclosed can be implemented in the context of any computer-implemented system including a database system, a multi-tenant environment, or the like. Moreover, this technology can be implemented using two or more separate and distinct computer-implemented systems that cooperate and communicate with one another. This technology can be implemented in numerous ways, including as a process, a method, an apparatus, a system, a device, a computer readable medium such as a computer readable storage medium that stores computer readable instructions or computer program code, or as a computer program product comprising a computer usable medium having a computer readable program code embodied therein.

As used herein, the "identification" of an item of information does not necessarily require the direct specification of that item of information. Information can be "identified" in a field by simply referring to the actual information through one or more layers of indirection, or by identifying one or more items of different information which are together sufficient to determine the actual item of information. In addition, the term "specify" is used herein to mean the same as "identify."

As used herein, a given signal, event or value is "dependent on" a predecessor signal, event or value if the predecessor signal, event or value influenced the given signal, event or value. If there is an intervening processing element, step or time period, the given signal, event or value can still be "dependent on" the predecessor signal, event or value. If the intervening processing element or step combines more than one signal, event or value, the signal output of the processing element or step is considered "dependent on" each of the signal, event or value inputs. If the given signal, event or value is the same as the predecessor signal, event or value, this is merely a degenerate case in which the given signal, event or value is still considered to be "dependent on" the predecessor signal, event or value. "Responsiveness" of a given signal, event or value upon another signal, event or value is defined similarly.

In some implementations, the network(s) can be any one or any combination of Local Area Network (LAN), Wide Area Network (WAN), WiFi, WiMax, telephone network, wireless network, point-to-point network, star network, token ring network, hub network, peer-to-peer connections like Bluetooth, Near Field Communication (NFC), Z-Wave, ZigBee, or other appropriate configuration of data networks, including the Internet.

In some implementations, the engine can be of varying types including a workstation, server, computing cluster, blade server, server farm, or any other data processing system or computing device. The engine can be communicably coupled to the databases via a different network connection.

In some implementations, datastores can store information from one or more tenants into tables of a common database image to form a multi-tenant database system (MTS). A database image can include one or more database objects. In other implementations, the databases can be relational database management systems (RDBMSs), object oriented database management systems (OODBMSs), distributed file systems (DFS), no-schema databases, or any other data storing systems or computing devices. In some implementations, user computing device can be a personal computer, laptop computer, tablet computer, smartphone, personal digital assistant (PDA), digital image capture devices, and the like.

The examples described above should not be taken as limiting or preferred. These examples sufficiently illustrate the technology disclosed without being overly complicated, and are not intended to illustrate all embodiments of the technology disclosed. A person having ordinary skill in the art will appreciate that there are many potential applications for one or more implementations of this disclosure.

One of ordinary skill in the art can appreciate that a computer or other client device can be deployed as part of a computer network. In this regard, the technology disclosed pertains to any computer system having any number of memory or storage units, and any number of applications and processes occurring across any number of storage units or volumes. The technology disclosed can apply to an environment with server computers and client computers deployed in a network environment, having remote or local storage. The technology disclosed can also apply to a standalone computing device, having programming language functionality, interpretation and execution capabilities.

While the technology disclosed is disclosed by reference to the preferred embodiments and examples detailed above, it is to be understood that these examples are intended in an illustrative rather than in a limiting sense. It is contemplated that modifications and combinations will readily occur to those skilled in the art, which modifications and combinations will be within the spirit of the technology disclosed and the scope of the following claims.

What is claimed is:

1. A system comprising a network node including memory, a processor and a communication port, the network node being configured with logic to:

store in memory accessible by the processor, a log of graphical objects, the graphical objects identified in the log having locations and dimensions in a workspace, and have variant types, where the variant types have variant data structures configured to be rendered by a respective rendering procedures; and invoke execution of a publish function, the publish function composing and storing an electronic document, the electronic document including:

a set of graphical objects identified in the log;

a set of viewers, including rendering procedures for rendering on a display the graphical objects in the set of graphical objects of the variant types using the respective rendering procedures; and instructions that, when executed on a computer device, produce a sequence of images to be rendered within a screen space having dimensions on a display, including:

(a) determining a current viewport defining an area within the workspace;

(b) determining dimensions of the screen space;

(c) identifying a subset of graphical objects in the set of graphical objects that overlap with the defined area of the current viewport;

(d) invoking viewers for the subset of graphical objects to produce a current image including in combination the subset of graphical objects on the screen space; and (e) changing the current viewport in response to user input and repeating steps (a) to (d);

wherein the publish function produces a URL for the electronic document, and the network node being configured with logic to send the URL to a consumer network node.

2. The system of claim 1, wherein the log of graphical objects comprises a log of events that create, delete or move graphical targets in the workspace, where the graphical targets include the graphical objects in the log, and where the publish function includes logic to filter the log of events to remove events that are obsolete with respect to the workspace when the publish function is executed.

3. The system of claim 1, wherein the network node is configured to:

establish a link to at least one other network node;

retrieve from the at least one other network node at least part of the log of graphical objects having locations in the workspace, and store a local log using the retrieved at least part of the log, where entries in the local log including a location in the workspace of the graphical object;

map a screen space to a viewport defining a mapped area within the workspace, to identify entries in the local log within the mapped area, and to render graphical objects of the identified entries onto the displayable area;

accept input data from a user input device relating to modification and creation of graphical objects displayed within the displayable area, and to send messages based upon the input data relating to modification and creation of graphical objects to the at least one other network node; and accept messages from the at least one other network node relating to modification and creation of graphical objects having locations within the workspace, and to update the local log based upon the accepted messages.

4. The system of claim 1, wherein the instructions in the electronic document include instructions which when executed apply a scale factor in the rendering of the graphical objects in the identified subset which is a function of the dimensions of the current viewport and the dimensions of the screen space on the display.

5. The system of claim 1, wherein the electronic document includes an initial viewport specification, and instructions to use the initial viewport specification as the current viewport when opening the electronic document.

6. The system of claim 1, wherein an initial viewport specification is included in the URL.

7. The system of claim 1, wherein the screen space is a browser window on a display.

8. The system of claim 1, wherein the screen space is a browser window on a display, and the instructions in the electronic document include logic to determine current dimensions of the browser window on the display to determine the dimensions of the screen space.

9. The system of claim 1, wherein the variant types of graphical objects include a paged image, and the publish function includes logic to produce a plurality of page images of pages in the paged image, a graphical frame for the page images, and a graphical prompt which invokes instructions to change the paged image shown in the graphical frame.

10. The system of claim 1, wherein the variant types of graphical objects include a website, and the publish function includes logic to produce a graphical frame, and logic which when rendered retrieves a page from the website and renders the retrieved page in the graphical frame.

11. The system of claim 1, wherein the variant types of graphical objects include a plurality of image file types having different formats.

12. The system of claim 1, wherein the variant types of graphical objects include an image file, and the publish function includes logic to produce a set of versions of the image file, each member of the set having a different resolution, and the viewer in the electronic document for the image file includes logic to select a member of the set of versions as a function of the dimensions of the viewport in the workspace and the dimensions of the screen space.

13. The system of claim 1, wherein the electronic document includes a log file mapping the graphical objects in the workspace to locations in the workspace, and the instructions in the electronic document include instructions to search the log file to identify the subset of graphical objects within the current viewport.

14. The system of claim 1, wherein the workspace includes a location marker data structure, identifying a location in the workspace, and wherein the electronic document includes instructions to present graphical user interface constructs enabling user input to select a location marker, and in response to selection of a location marker to change the current viewport to a region in the workspace including the identified location.

15. An electronic document comprising a tangible non-transitory computer readable memory storing:

a set of graphical objects, the graphical objects in the set having a location and dimensions in a virtual workspace, the set having members of variant types, where the variant types have variant data structures rendered by a respective rendering procedures;

a set of viewers, with parameters and procedures for rendering the graphical objects in the set of graphical objects of the variant types using the respective rendering procedures; and instructions that, when executed on a computer device, produce a sequence of images to be rendered within a screen space having dimensions on a display in communication with the computer device, including:

(a) determining a current viewport defining an area within a workspace;
(b) determining dimensions of the screen space;
(c) identifying a subset of graphical objects in workspace that overlap with the defined area of the current viewport;
(d) invoking viewers for the subset of graphical objects to produce in combination a current image including the subset of graphical objects on the screen space; and
(e) changing the current viewport in response to user input and repeating steps (a) to (d);
wherein the electronic document is associated with a URL.

16. The electronic document of claim 15, wherein the instructions include instructions which when executed apply a scale factor in the rendering of the graphical objects in the identified subset which is a function of the dimensions of the viewport in the workspace and the dimensions of the screen space on the display.

17. The electronic document of claim 15, wherein the screen space is a browser window on a display.

18. The electronic document of claim 15, including an initial viewport specification, and instructions to use the initial viewport specification as the current viewport when opening the electronic document.

19. The electronic document of claim 15, wherein an initial viewport specification is included in the URL.

20. The electronic document of claim 15, wherein the screen space is a browser window on a display, and the instructions in the electronic document include logic to determine current dimensions of the browser window on the display to determine the dimensions of the screen space.

21. The electronic document of claim 15, wherein the variant types of graphical objects include a paged image, having a graphical frame, and a plurality of page images of pages in the paged image, and a graphical prompt which invokes instructions to change the paged image shown in the graphical frame.

22. The electronic document of claim 15, wherein the variant types of graphical objects include a website image, having a graphical frame, and which when rendered retrieves a page from the website and renders the retrieved page in the graphical frame.

23. The electronic document of claim 15, wherein the variant types of graphical objects include a plurality of image file types having different formats.

24. The electronic document of claim 15, wherein the variant types of graphical objects include an image file, and the electronic document includes a set of versions of the image file, each member of the set having a different resolution, and the viewer in the electronic document for the image file includes logic to select a member of the set of versions as a function of the dimensions of the current viewport in the workspace and the dimensions of the screen space.

25. The electronic document of claim 15, including a log file mapping the graphical objects in the workspace to locations in the workspace, and the instructions include instructions to search the log file to identify the subset of graphical objects within the current viewport.

26. The electronic document of claim 15, wherein the workspace includes a location marker data structure, identifying a location in the workspace, and including instructions to present a graphical user interface enabling user input to select a location marker, and in response to selection of a location marker to change the current viewport to a region in the workspace including the identified location.

27. A computer system including a network node, the network node comprising:
a processor, memory and a communication port; and
an electronic document stored in memory accessible by the processor, the electronic document including:
a set of graphical objects, the graphical objects in the set having a location and dimensions in a virtual workspace, the set having members of variant types, where the variant types have variant data structures rendered by a respective rendering procedures;
a set of viewers, with parameters and procedures for rendering the graphical objects in the set of graphical objects of the variant types using the respective rendering procedures; and
instructions that, when executed by the processor, produce a sequence of images to be rendered within a screen space having dimensions on a display, including:
(a) determining a current viewport defining an area within a workspace;
(b) determining dimensions of the screen space;
(c) identifying a subset of graphical objects in the workspace that overlap with the defined area of the current viewport;
(d) invoking viewers for the subset of graphical objects to produce in combination a current image including the subset of graphical objects on the screen space; and
(e) changing the current viewport in response to user input and repeating steps (a) to (d);
wherein the electronic document has a URL, and the network node is configured with logic to send the electronic document to a consumer network node in response to the URL.

28. The system of claim 27, wherein the instructions in the electronic document include instructions which when executed apply a scale factor in the rendering of the graphical objects in the identified subset which is a function of the dimensions of the viewport in the workspace and the dimensions of the screen space on a display.

29. The system of claim 27, wherein the electronic document includes an initial viewport specification, and instructions to use the initial viewport specification as the current viewport when opening the electronic document.

30. The system of claim 27, wherein an initial viewport specification is included in the URL.

31. The system of claim 27, wherein the screen space is a browser window on a display.

32. The system of claim 27, wherein the screen space is a browser window on a display, and the instructions in the electronic document include logic to determine current dimensions of the browser window on the display to determine the dimensions of the screen space.

33. The system of claim 27, wherein the variant types of graphical objects include a paged image type, having a graphical frame, and a plurality of page images of pages in the paged image type graphical object, and a graphical prompt which invokes instructions to change the paged image shown in the graphical frame.

34. The system of claim 27, wherein the variant types of graphical objects include a website image, having a graphical frame, and which when rendered retrieves a page from the website and renders the retrieved page in the graphical frame.

35. The system of claim 27, wherein the variant types of graphical objects include an image file, and the electronic document includes a set of versions of the image file, each member of the set having a different resolution, and the viewer in the electronic document for the image file includes logic to select a member of the set of versions as a function of the dimensions of the viewport in the workspace and the dimensions of the screen space.

36. The system of claim 27, wherein the electronic document includes a log file mapping the graphical objects in the workspace to locations in the workspace, and the instructions include instructions to search the log file to identify the subset of graphical objects within the current viewport.

37. The system of claim 27, wherein the workspace includes a location marker data structure, identifying a location in the workspace, and wherein the electronic document includes instructions to present graphical user interface constructs enabling user input to select a location marker, and in response to selection of a location marker to change the current viewport to a region in the workspace including the identified location.

* * * * *